United States Patent
Scarbrough et al.

(10) Patent No.: US 7,290,802 B1
(45) Date of Patent: Nov. 6, 2007

(54) SECOND SURFACE MICROMOTION DISPLAY

(75) Inventors: Joel Scott Scarbrough, Burlington, WI (US); Daniel C. Faul, West Bend, WI (US)

(73) Assignee: Serigraph, Inc., West Bend, WI (US)

( * ) Notice: Subject to any disclaimer, the term of this patent is extended or adjusted under 35 U.S.C. 154(b) by 707 days.

(21) Appl. No.: 10/389,438

(22) Filed: Mar. 14, 2003

Related U.S. Application Data

(63) Continuation-in-part of application No. 10/388,782, filed on Mar. 14, 2003, now Pat. No. 7,048,307, and a continuation-in-part of application No. 10/376,130, filed on Feb. 28, 2003, which is a continuation-in-part of application No. 10/239,670, filed on Jan. 22, 2003, now abandoned.

(51) Int. Cl.
    B42F 21/00 (2006.01)

(52) U.S. Cl. ............................ 283/41; 283/94; 283/91; 283/107; 283/109; 283/111; 428/29; 428/30; 428/40.1; 428/41.7; 428/42.1; 428/42.3; 428/195; 359/618; 359/619

(58) Field of Classification Search ............ 283/94, 283/107, 109, 111, 41, 91; 428/29, 30, 40.1, 428/41.7, 42.1, 42.3, 195; 359/618, 619
    See application file for complete search history.

(56) References Cited

U.S. PATENT DOCUMENTS

| | | | | |
|---|---|---|---|---|
| 1,918,705 A | * | 7/1933 | Ives | 359/463 |
| 2,065,406 A | * | 12/1936 | Silverman | 428/13 |
| 2,149,171 A | * | 2/1939 | Grote | 40/615 |
| 2,951,419 A | * | 9/1960 | Lemelson | 359/542 |
| 3,268,238 A | * | 8/1966 | Finkel | 352/81 |
| 4,588,899 A | * | 5/1986 | Erhardt | 250/491.1 |
| 4,667,092 A | * | 5/1987 | Ishihara | 250/216 |
| 4,721,635 A | * | 1/1988 | Helinski | 428/15 |
| 4,913,504 A | | 4/1990 | Gallagher | 350/3.6 |
| 4,933,218 A | | 6/1990 | Longobardi | 428/38 |
| 5,082,703 A | | 1/1992 | Longobardi | 428/38 |
| 5,106,126 A | * | 4/1992 | Longobardi et al. | 283/94 |
| 5,270,101 A | | 12/1993 | Helicher | 428/209 |
| 5,407,711 A | * | 4/1995 | Lovison et al. | 428/13 |
| 5,456,967 A | | 10/1995 | Nezu | 428/141 |
| 5,461,495 A | * | 10/1995 | Steenblik et al. | 359/463 |
| 5,468,540 A | * | 11/1995 | Lu | 428/156 |
| 5,492,370 A | | 2/1996 | Chatwin et al. | 283/110 |
| 5,532,786 A | * | 7/1996 | Hassall et al. | 355/22 |

(Continued)

FOREIGN PATENT DOCUMENTS

WO     WO98/33660     8/1998

*Primary Examiner*—Monica S. Carter
*Assistant Examiner*—Mark T. Henderson
(74) *Attorney, Agent, or Firm*—Andrus, Sceales, Starke & Sawall, LLP

(57) ABSTRACT

A second surface micromotion display includes a see-through base having a first surface, defined in the art as a front surface facing a viewer, and a second surface, defined in the art as a rear surface opposite to the front surface and facing away from the viewer, an image formed over the second surface, a micromotion textured pattern formed over the image, and a reflective layer over the micromotion textured pattern, such that the illusion of motion is viewable through the base as reflected from the reflective layer through the micromotion textured pattern.

14 Claims, 16 Drawing Sheets

U.S. PATENT DOCUMENTS

| | | | |
|---|---|---|---|
| 5,624,732 A * | 4/1997 | Oshima et al. | 428/167 |
| 5,642,226 A * | 6/1997 | Rosenthal | 359/619 |
| 5,716,682 A * | 2/1998 | Lovison et al. | 428/30 |
| 5,741,578 A | 4/1998 | Sax | 428/212 |
| 5,742,411 A * | 4/1998 | Walters | 359/2 |
| 5,744,219 A | 4/1998 | Tahara | 428/195 |
| 5,762,379 A | 6/1998 | Salmon et al. | 283/91 |
| 5,851,032 A | 12/1998 | Green | 283/72 |
| 6,042,888 A | 3/2000 | Sismanis et al. | 427/256 |
| 6,043,481 A * | 3/2000 | Tan et al. | 250/216 |
| 6,046,848 A * | 4/2000 | Gulick, Jr. | 359/463 |
| 6,084,713 A * | 7/2000 | Rosenthal | 359/619 |
| 6,113,149 A | 9/2000 | Dukatz | 283/91 |
| 6,132,822 A | 10/2000 | Overcash et al. | 428/34.2 |
| 6,145,565 A | 11/2000 | Fromson et al. | 156/580 |
| 6,170,881 B1 | 1/2001 | Salmon et al. | 283/91 |
| 6,180,228 B1 | 1/2001 | Mueller et al. | 428/354 |
| 6,181,446 B1 | 1/2001 | Cox et al. | 359/3 |
| 6,187,389 B1 | 2/2001 | Overcash et al. | 427/488 |
| 6,749,925 B2 * | 6/2004 | Hoppe et al. | 428/167 |
| 6,856,462 B1 * | 2/2005 | Scarbrough et al. | 359/619 |
| 7,048,307 B1 * | 5/2006 | Scarbrough et al. | 283/41 |

* cited by examiner

SECOND SURFACE MICROMOTION DISPLAY

CROSS-REFERENCE TO RELATED APPLICATIONS

This application is a continuation-in-part of U.S. patent application Ser. No. 10/388,782 filed Mar. 14, 2003 now U.S. Pat. No. 7,048,307, filed on even date herewith, and a continuation-in-part of U.S. patent application Ser. No. 10/376,130, filed Feb. 28, 2003, which is a continuation-in-part of U.S. patent application Ser. No. 10/239,670, filed Jan. 22, 2003 now abandoned, all incorporated herein by reference.

BACKGROUND AND SUMMARY

Parent Applications

'158 Application

The invention of the above-noted parent application Ser. No. 10/376,130 (hereinafter the '158 application/invention) relates generally to a printed article, and more particularly to a reflective printed article having a graphic design such as a trading card, greeting card, sign, poster, label, decal, book cover, decorative panel, name plate, visual display and the like having a reflective image with a textured pattern printed thereon creating visual illusions of depth, three-dimensionality, hidden images and motion in the printed article.

In order to attract the attention of consumers, many products are being manufactured with images that provide a unique and sensational visual presentation. To meet this demand, a variety, of printing techniques have been developed to produce aesthetically pleasing visual effects, such as the appearance of depth, three-dimensionality and motion. Various methods are known in the prior art that produce three-dimensional images on two-dimensional media.

One method involves printing two offset images in different colors on an opaque or transparent sheet, and viewing the images using special glasses having right and left lenses which correspond to the different image colors respectively. Holographic technology can also be used to produce an image on a flat sheet which appears three-dimensional when illuminated and viewed at the proper angles.

However, these methods have not been commercially popular for various reasons. The offset image method is undesirable in that special glasses are required to view the image. Holographic images or holograms are difficult and expensive to produce. Therefore, processes have been developed to produce the illusion of three-dimensional images on two-dimensional media. One such process is conventional embossing, which forms a raised pattern on a substrate by physically deforming part of the substrate upwardly. However, embossing suffers from the drawback that an expensive press is necessary to perform the operation, and a die bearing the desired embossed pattern must be made for each application. Further, the materials that can be used for embossing are limited because of the deforming nature of the embossing process.

Therefore, a need exists for a printing method and printed article that offers the visual impact of embossing without the cost. The assignee of the '158 invention has developed a number of printing methods for printing a variety of visually stimulating images creating the illusion of depth and three-dimensionality as disclosed in U.S. Pat. Nos. 5,762,379; 6,113,149; and 6,170,881; the disclosures of which are incorporated herein by reference. The '158 invention provides an improved printing method for printing reflective images on a printed article having the illusion of depth, three-dimensionality, hidden images and motion.

Therefore, it is an object of the '158 invention to provide a printing method and printed article which overcomes the drawbacks of the prior art. It is another object of the '158 invention to provide a printing method for printing reflective images on a printed article creating the illusion of depth, three-dimensionality, hidden images and motion on the printed article. It is yet another object of the invention to provide a printing method for printing images on a printed article which change, appear, disappear, and/or move as the viewing angle of the printed article is changed.

The '158 invention includes a substrate having a top surface and a bottom surface. The substrate may be formed of any suitable type of printable material. In a preferred embodiment, a reflective or glossy ink is printed over the entire top surface of the substrate. Alternatively, a reflective foil or chrome may be deposited or laminated onto the top surface of the substrate. A graphic design or image is printed over the reflective layer. The image may cover the entire portion of the reflective layer or only selected portions thereof. The image may comprise a plurality of ink layers in order to provide the desired graphic design. The graphic design or image may also include hidden or latent images printed within the graphics. The graphic design or image may be applied through silk screening, lithography, flexography and other known printing techniques. An optional glossy layer of a clear coating or transparent ink may be printed over the image layer and the reflective layer. Printed on top of the optional glossy layer and/or image layer is a textured pattern or plurality of light bending textured lines of transparent ink oriented in various directions and angles to produce the desired brilliant visual effect of depth, three-dimensionality, hidden images and motion. This transparent ink has rheological properties such that when it is applied, a line of the ink flows into a semi-cylindrical or other convex shape when viewed in cross-section. These convex shaped lines produce a reflective textured pattern on the surface of the printed article. Other printing may be added over and/or around the image and textured lines as desired.

The textured pattern includes raised ridges for bending and reflecting light to create an iridescent visual effect and the visual illusion of depth, three-dimensionality, hidden latent images and motion through changes in color, tinting and reflectiveness. The textured pattern is created by a plurality of very thin lines spaced very close together at various angles and orientations to reflect light in various directions creating the illusion of movement as the printed article is viewed from different angles. The embossing method also allows for several variations to be produced. In another embodiment, a reflective or glossy ink may be printed over the entire top surface of the substrate. Alternatively, a reflective foil or chrome may be deposited or laminated onto the top surface of the substrate. A graphic design or image is printed over the reflective layer.

The textured pattern of lines are preferably printed in bands, rays or sections, with each line in the band, ray or section being printed at the same angle or orientation. The lines of adjacent bands, rays or sections are generally printed at a different angle or orientation in order to reflect light in a different direction to create the desired visual effect.

In another embodiment, the textured pattern is preferably formed by a clear plastic sheet that is laminated to the top or bottom surface of the substrate. The textured pattern of light manipulating lines is preferably created by impressing, embossing, or otherwise stamping the clear plastic laminate with a die or other embossing agent. The textured pattern of light controlling lines or lenses, having a semi-circular cross-section, may be formed in the clear plastic sheet before or after it is laminated to the printed article. An advantage of using a laminate instead of an ink, is that the light controlling lines may be spaced closer together.

'172 Application

The invention of the above-noted parent application Ser. No. 10/388,782 (hereinafter the '172 application/invention) relates to reflective displays, including image displays, and methods of manufacture, for example trading cards, greeting cards, signs, posters, labels, decals, book covers, decorative panels, packaging, name plates, and other displays including designs incorporating a selective area of metallic appearance resembling liquid metal, and other reflective displays.

The '172 invention arose during continuing development efforts relating to image displays, including printed articles, including subject matter related to U.S. Pat. Nos. 6,170,881 and 5,762,379 owned by the assignee of the present invention, and incorporated herein by reference.

Highly reflective materials have long been known to attract the human eye. Metallic inks, hot stamping foils, vacuum metallized substrates, metallic flakes incorporated into inks and coatings have all been used to impart such eye catching and aesthetically pleasing effects to decorated articles. Each of these techniques has advantages and disadvantages. The major disadvantage has been the inability to apply a metallic or holographic effect selectively and impart texture and/or thickness if desired to the metallic area. The ability to selectively apply metallics has been limited to printing metallic inks, selectively blocking out a metallic substrate (only allowing the desired areas of the metallic substrate to show through), or to hot stamp. Metallic inks do not have the reflective brilliance of vacuum metallized foils and substrates. Hot stamping requires the use of expensive equipment and expensive hot stamping dyes. The above-noted incorporated U.S. Pat. No. 6,170,881 provides one solution. The '172 invention provides a further improvement, including enhanced economy of manufacture.

Present Invention

The present invention relates to displays, including image displays including printed articles, for example trading cards, greeting cards, signs, posters, labels, decals, book covers, decorative panels, packaging, name plates, and other displays including designs incorporating regions of controlled reflected light to create the illusion of motion.

A variety of printing techniques have been developed over the years to produce aesthetically pleasing effects, such as the appearance of depth, three-dimensionality and motion. One way to provide these visually pleasing effects in a printed article is through printing fine clear lines, using lenticular technology or embossing/etching. As noted above, the texture used to control reflected light to create the effect of motion is achieved by printing fine lines of clear ink with specific characteristics directly on the surface of the decorated article. The reflected light is controlled by the light gathering and light scattering effect of the clear ink lines when the fine lines are moved relative to the viewer. The control of the reflected light is achieved through the use of embossing (or debossing) directly onto a substrate followed by applying a smooth surface which creates a significant increase in depth and dimensionality.

The present invention provides the benefits of printing the light controlling characteristics (versus the prior art of microetching or embossing using expensive embossing dies) and the highly reflective characteristics of a metallic layer. One embodiment uses the texture of the clear ink to bend the reflective metallic layer such that the controlled reflection is created by the reflective metallic layer and is much stronger and clearer as compared to the controlled reflected light created by the clear ink. The direct reflected light is not diminished through absorption and scattering effects of the printed ink. A further embodiment incorporates a smooth clear surface that offers additional protection. Increased distance between the embossed (debossed) substrate and the smooth clear plastic surface creates additional depth and dimensionality.

In one embodiment, a decorative article is presented in which unusual eye catching visual effects are created. The use of clear coating or ink to induce controlled dimensions in a reflective layer creates a unique effect of motion of reflected light as viewing angle is changed. The reflected light is controlled by applying a clear ink in specific patterns and subsequently applying a reflective layer behind this clear ink. The clear ink provides the shape to the reflective layer. The clear ink is applied in regions where appropriate to the desired effect. Each region is composed of fine lines, dots, curved lines, or other shapes. Each separate region contains a different pattern (typically fine lines). These fine lines (or other shapes) will control the direction of reflected light. By controlling these regions, the reflected light is controlled, and as the viewing angle is changed, each region will change in terms of gloss creating the effect of motion.

In one embodiment of a printed article in accordance with the invention, a clear substrate base has a top surface and a bottom surface. The top surface is the first surface, defined in the art as a front surface facing a viewer. The bottom surface is the second surface, defined in the art as a rear surface opposite to the front surface and facing away from the viewer. A textured pattern of clear ink is printed onto the second surface. The article may incorporate a graphic design or image layer printed prior to the textured pattern of clear ink. The graphic design image layer is typically made up of process printing using both transparent and opaque inks depending on how much reflective foil is desired to show through the graphic design image. The image may include a plurality of ink layers in order to provide the desired graphic image on the substrate base. The graphic image may be applied through silk screening, lithography, flexography, and other techniques known in the art. The inks are preferably curable in response to the application of ultraviolet light. The textured light controlling ink layer creates an illusion of motion in the graphic image design through the textured clear ink creating a duplicate pattern in a reflective layer which is applied over the clear textured ink providing the micromotion textured pattern. The controlled clear ink micromotion textured pattern is comprised of parallel lines (lines may be curved or irregular), or other shapes which impart a specific light directing pattern when married with the reflective layer for that particular region. Each region of a specific light controlling clear ink pattern has parallel lines (or shapes) that are at different angles than other regions. The lines (or shapes) when married to the reflective layer gather and reflect light in accordance with their direction of lines or pattern. Each region contains a different amount of reflected light. As the printed article is moved (or the viewing angle changes), the amount of reflected light changes in relation to the direction of the lines in each region. Gradual changes in angles from region to region cause the reflected light to move gradually from region to region. Larger changes in angles of the lines from region to region cause the reflected light to flash off and on from region to region. The reflective layer can be roll leaf foil, hot stamp foil, a metallized laminate, a metallic ink, a vacuum metallized layer, coating or any other reflective layer that would impart the desired controlled reflectivity of light creating motion of reflected light. The first surface may include graphics applied to increase the illusion of depth and dimension. The clear substrate base can be textured with a different or complementary texture to the texture married to the reflective layer on the second surface. The reflective material conforms to the clear ink lines of the micromotion textured pattern to control the reflected light and create the illusion of motion.

BRIEF DESCRIPTION OF THE DRAWINGS

Parent Applications

'158 application

FIG. 1 is an enlarged cross-sectional view of one embodiment of a printed article produced in accordance with the '158 invention.

FIG. 2 is an enlarged cross-sectional view illustrating a modification of the embodiment shown in FIG. 1.

FIG. 3 is an enlarged cross-sectional view illustrating another modification of the embodiment shown in FIG. 1.

FIG. 4 is an enlarged cross-sectional view illustrating yet another modification of the embodiment shown in FIG. 1.

FIG. 5 is an enlarged cross-sectional view of a second embodiment of a printed article produced in accordance with the '158 invention.

FIG. 6 is an enlarged cross-sectional view illustrating a modification of the embodiment shown in FIG. 5.

FIG. 7 is an enlarged cross-sectional view illustrating another modification of the embodiment shown in FIG. 5.

FIG. 8 is an enlarged cross-sectional view illustrating yet another modification of the embodiment shown in FIG. 5.

FIG. 9 is an enlarged cross-sectional view of a third embodiment of a printed article produced in accordance with the '158 invention.

FIG. 10 is an enlarged cross-sectional view illustrating a modification of the embodiment shown in FIG. 9.

FIG. 11 is an enlarged cross-sectional view illustrating another modification of the embodiment shown in FIG. 9.

FIG. 12 is an enlarged cross-sectional view illustrating yet another modification of the embodiment shown in FIG. 9.

FIG. 13 is an enlarged cross-sectional view of a fourth embodiment of a printed article produced in accordance with the '158 invention.

FIG. 14 is a top plan view of a trading card having an image printed thereon in accordance with the '158 invention.

FIG. 15 is an enlarged cross-sectional view of a fifth embodiment of a printed article produced in accordance with the '158 invention.

FIG. 16 is an enlarged cross-sectional view of a sixth embodiment of a printed article produced in accordance with the '158 invention.

FIG. 17 is an enlarged cross-sectional view of a seventh embodiment of a printed article produced in accordance with the '158 invention.

FIG. 18 is an enlarged cross-sectional view of an eight embodiment of a printed article produced in accordance with the '158 invention.

'172 Application

FIGS. 19–27 are taken from the above-noted '172 application.

Figure 19:
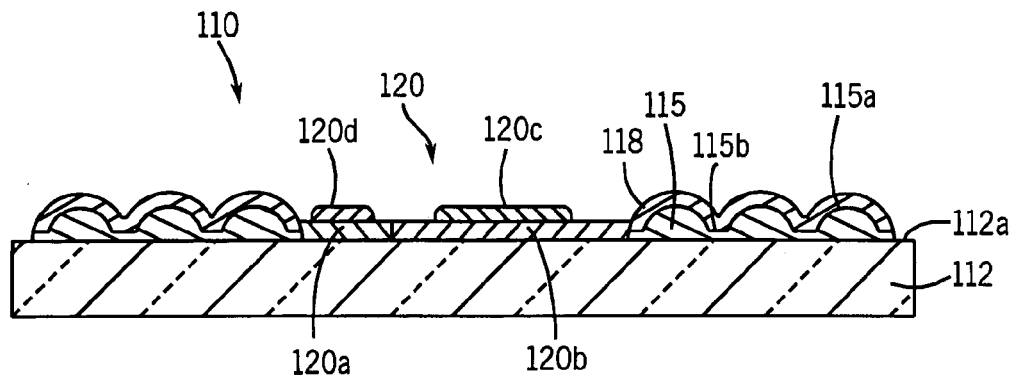

FIG. 19 is a cross-sectional view illustrating a display in accordance with the '172 invention.

Figure 20:
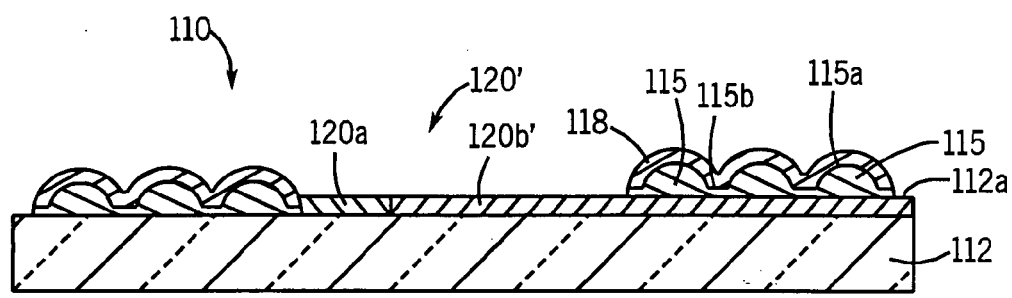
Figure 21:
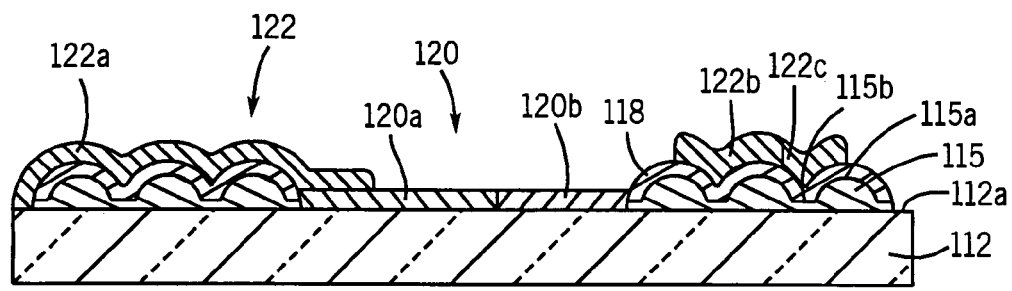
Figure 22:
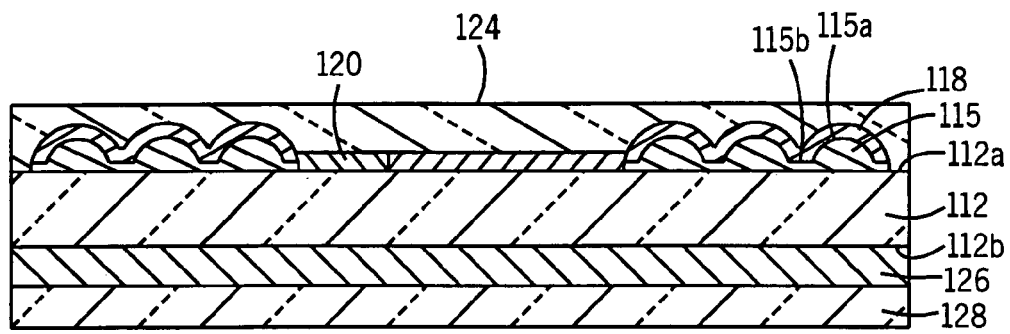
Figure 23:
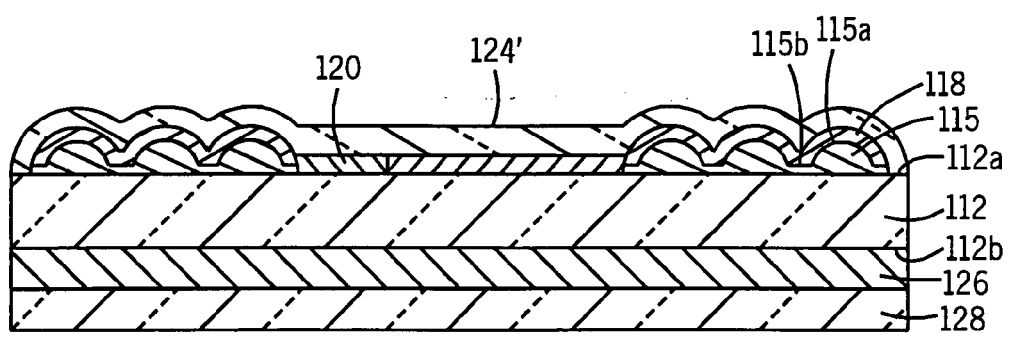
Figure 24:
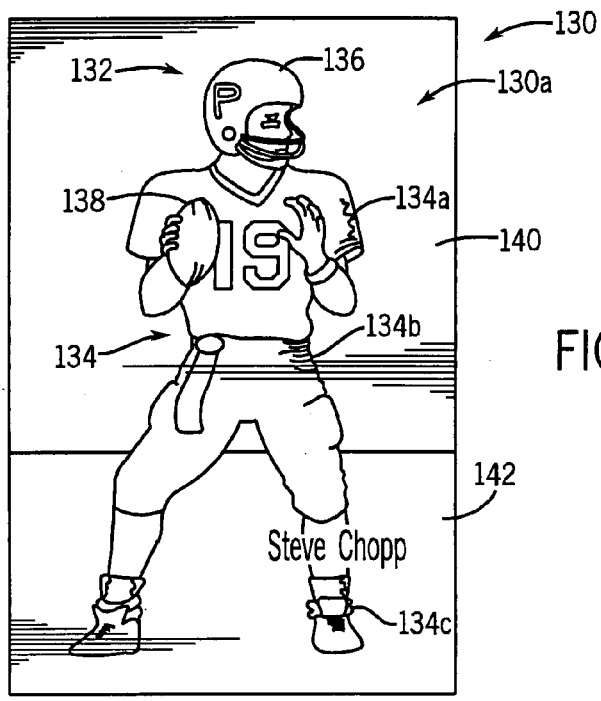
Figure 25:
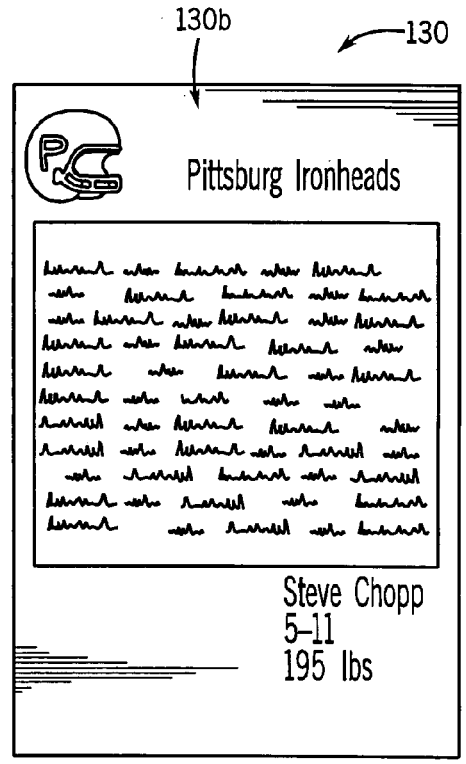
Figure 26:
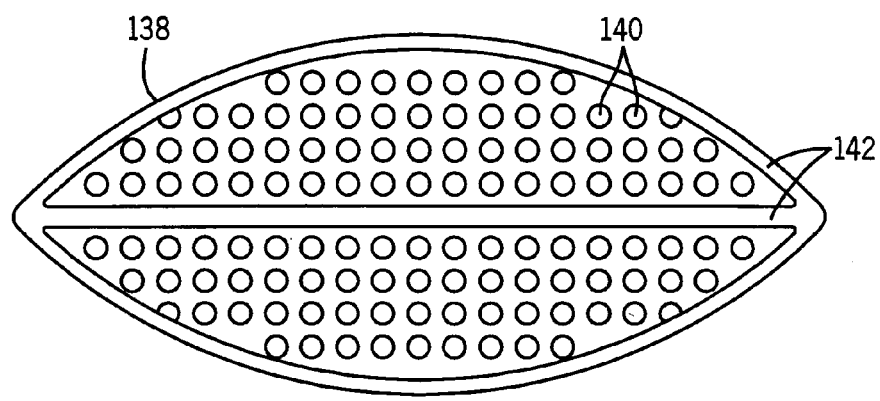
Figure 27:
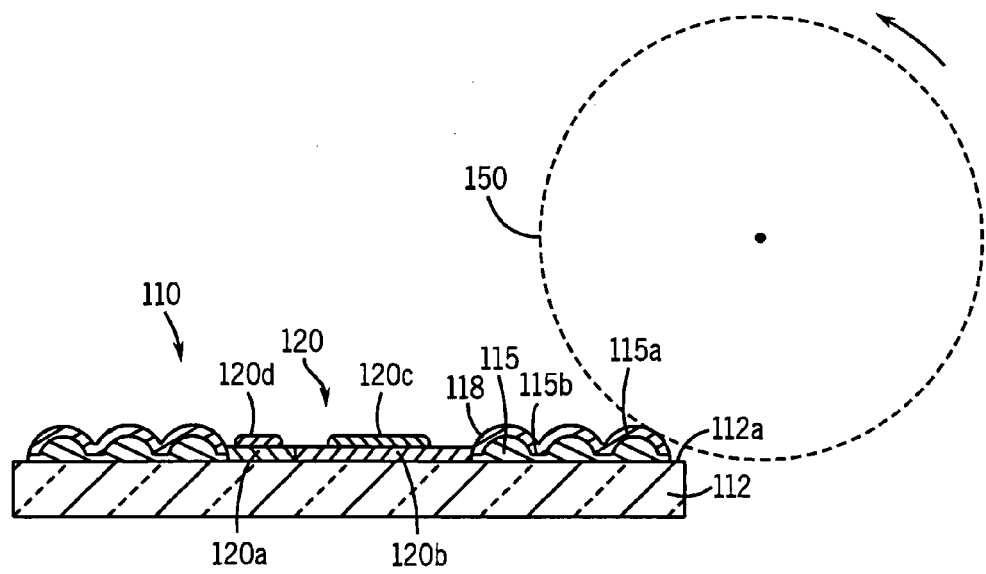

FIG. 20 is like FIG. 19 and shows a further embodiment.
FIG. 21 is like FIG. 19 and shows a further embodiment.
FIG. 22 is like FIG. 19 and shows a further embodiment.
FIG. 23 is like FIG. 19 and shows a further embodiment.
FIG. 24 is a front view of a trading card having an image display in accordance with the '172 invention.
FIG. 25 is a rear view of the trading card of FIG. 24.
FIG. 26 is an enlarged view of a portion of FIG. 24.
FIG. 27 is like FIG. 19 and illustrates a manufacturing step.

Present Invention

Figure 28:
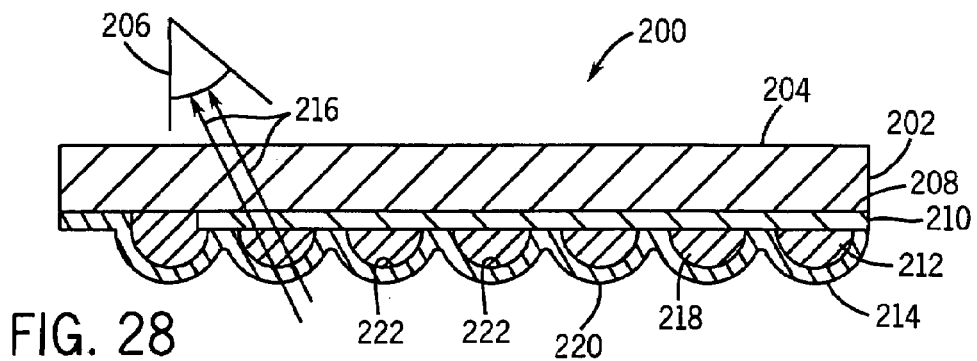

FIG. 28 is a cross-sectional view illustrating a second surface micromotion image display in accordance with the present invention.

Figure 29:
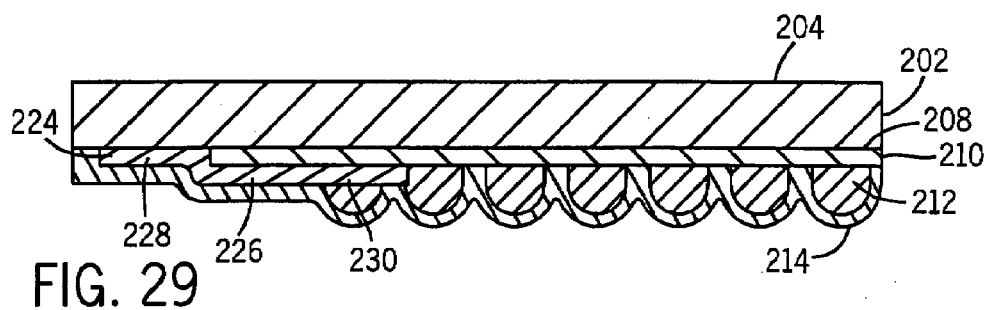
Figure 30:
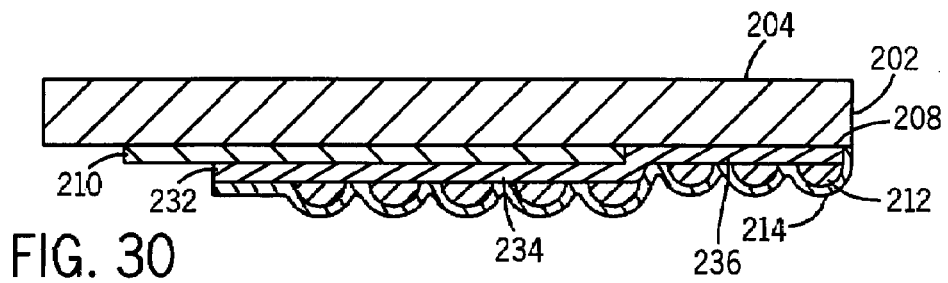
Figure 31:
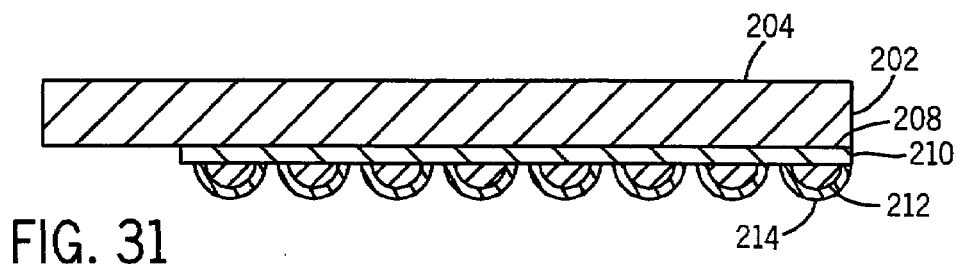
Figure 32:
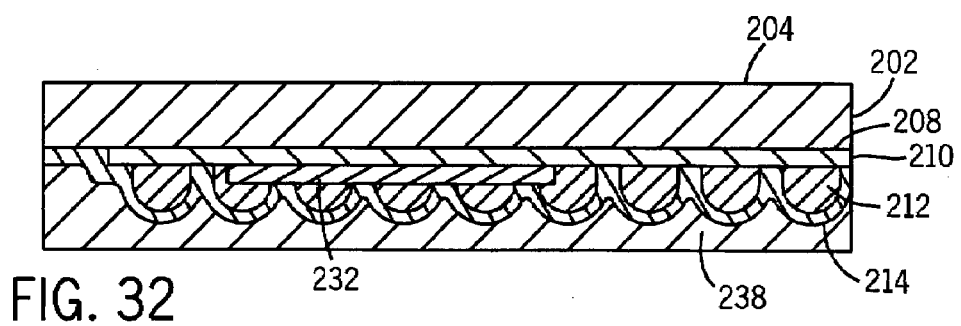

FIG. 29 is like FIG. 28 and shows a further embodiment.
FIG. 30 is like FIG. 28 and shows a further embodiment.
FIG. 31 is like FIG. 28 and shows a further embodiment.
FIG. 32 is like FIG. 28 and shows a further embodiment.

DETAILED DESCRIPTION OF THE INVENTION

Parent Applications

'158 application

Figure 1:
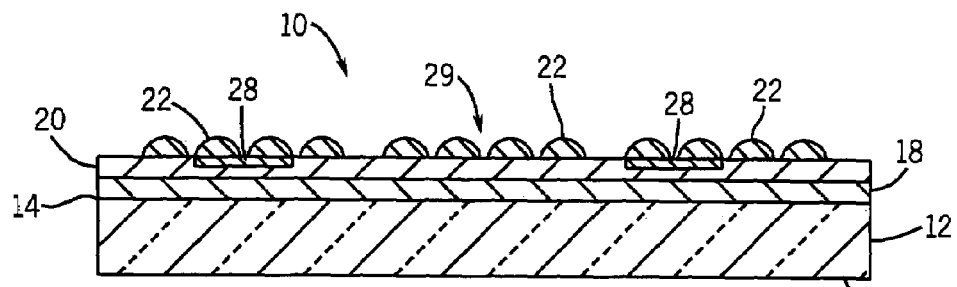
FIGS. 1–18 are taken from the above-noted '158 application.

Referring now to the drawings, FIG. 1 illustrates a cross sectional view of a first embodiment of a printed article produced in accordance with the '158 invention, depicted on a much enlarged basis over actual size. The printed article 10 includes a substrate 12 having a top surface 14 and a bottom surface 16. The substrate 12 can be formed of paper, cardboard, plastic, acrylic, glass, metal or any other suitable printable material.

A reflective ink layer 18 is printed over all or a portion of the top surface 14 of the substrate 12. The reflective layer 18 is preferably formed of reflective ink which is printed onto the substrate 12. The reflective layer 18 can be clear or have any color. The reflective layer 18 can be opaque, transparent, semi-transparent or translucent. The reflective layer 18 gives the printed article a shiny or glossy metallic appearance. Alternatively, the reflective layer 18 can be formed of a chrome film, diffraction film, metallic foil, holographic foil, roll leafing, or any metallized material having a shiny surface.

Figure 14:
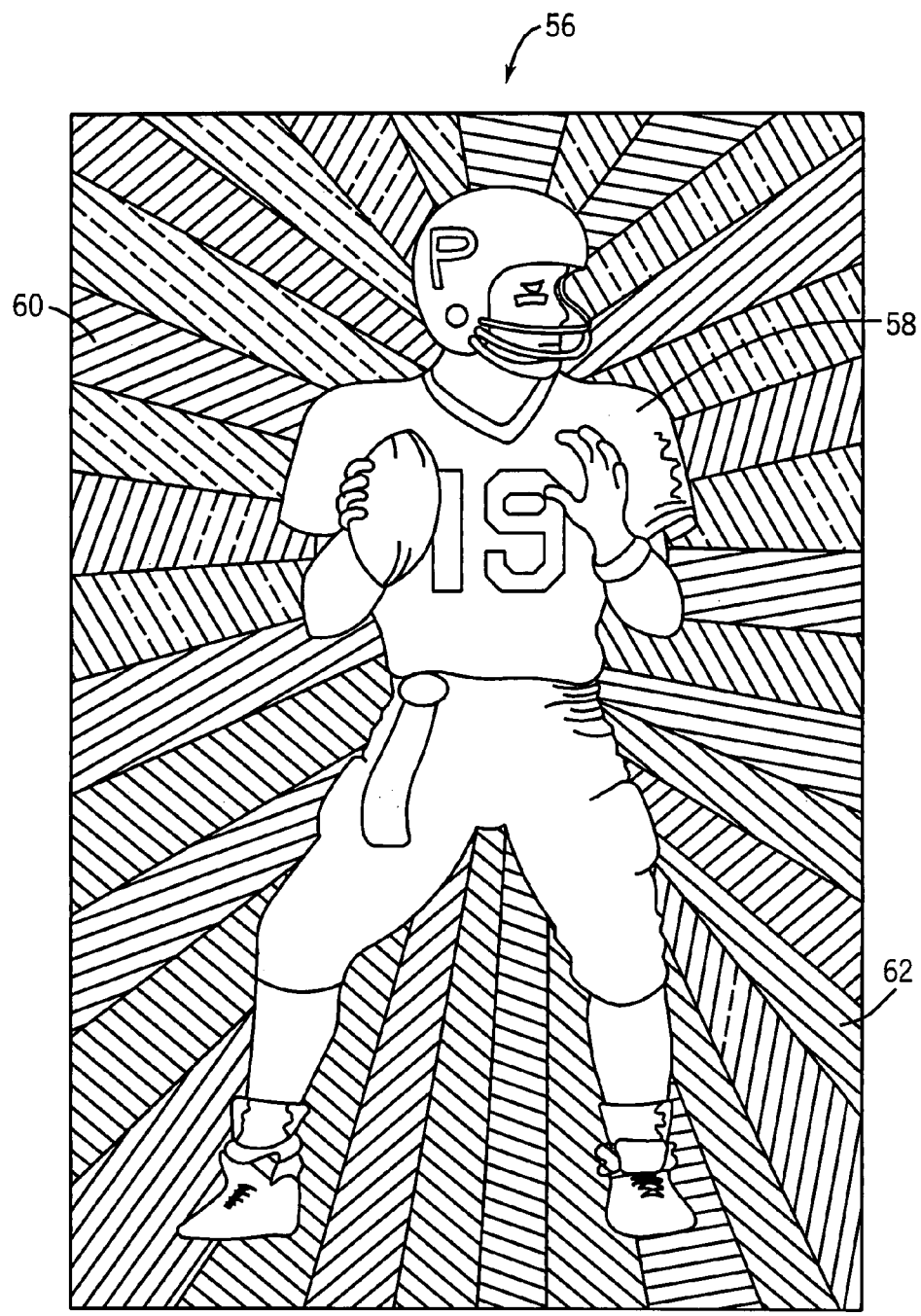

A graphic design or image 20 is printed over all or a portion of the reflective layer 18. The image 20 can have any desired form, for example, a football player on a sports trading card as shown in FIG. 14, or any other image. The graphic design or image 20 may comprise a plurality of ink layers in order to provide the desired design. The graphic design 20 may also include hidden or latent images 28 printed within the design. These hidden or latent images 28 are "weak" or "lightly" printed images that are printed among the plurality of ink layers of the graphic design, and are visible only at certain viewing angles. The hidden images 28 appear and disappear from a viewer as the viewing angle of the printed article is changed.

A preferred method of forming the graphic design 20 and hidden images 28 is through a four-color offset printing process where a base layer is printed and a four-color image is printed over the base layer. The graphic design 20 and hidden images 28 may be printed with opaque ink, semi-transparent ink, translucent ink, or any combination thereof. These inks are preferably curable in response to ultraviolet (UV) light. Other methods of forming the graphic design 20 and hidden images 28 images include silk screening, lithography, flexography, gravure or other known printing methods.

A textured pattern 29 is printed over and/or around the graphic design or image 20. The textured pattern includes a plurality of parallel convex rounded ridges or lines 22 of transparent ink printed in bands, rays or sections 60, FIG. 14, over and/or around the graphic design or image 20. The textured pattern 29 is created by a plurality of very thin lines 22 spaced very closely together at various angles and orientations to reflect light in various directions. In the preferred embodiment, the height and thickness of the lines is approximately 0.2 mils to 0.5 mils. However, the thickness, height and spacing of the lines may vary depending upon the particular application and desired visual effect. The textured pattern 29 can be formed over the entire surface of the image 20 or over only a portion thereof. The textured pattern 29 of lines 22 is preferably formed from a transparent ink, such as Nasdar 3527 or the like, printed on top of the graphic design or image 20 by a printing method such as silk screening, lithography, flexography, offset printing, gravure, coating or other known printing method. The transparent ink has rheological properties such that when it is applied, it flows into a semi-cylindrical or other convex shape when viewed in cross-section. This transparent ink is also preferably a UV curable ink. The transparent ink may also include flakes of glitter, or pearls, or other materials to produce a "glittery" effect on the printed article.

The textured pattern 29 gives the appearance of a raised or embossed effect, which simulates depth and three-dimensionality. The semi-cylindrically shaped raised ridges or lines bend and reflect light incident on the printed article 10 producing the visual illusion of depth, three-dimensionality, hidden images and motion through hue and color changes in the printed article as it is viewed from different angles. Light incident on the printed article 10 is reflected off the reflective layer 18 back through the graphic design or image 20 and the textured pattern 29 to create a unique visual effect. As mentioned previously, the textured pattern 29 includes a plurality of parallel lines 22 printed in bands, rays or sections 60 over the image 20. The parallel lines 22 in each section 60 are all oriented in the same direction to illuminate the entire section of printed lines when light is reflected from the reflective layer 18 through the textured pattern of lines. Adjacent sections 60 have parallel lines 22 oriented in different directions to reflect light in different directions as the printed article 10 is viewed from different angles. These different sections 60 of textured patterns of lines create the illusion of depth, three-dimensionality, appearing and disappearing images, and motion in the printed article 10 as it is viewed from different angles.

Figure 1A:
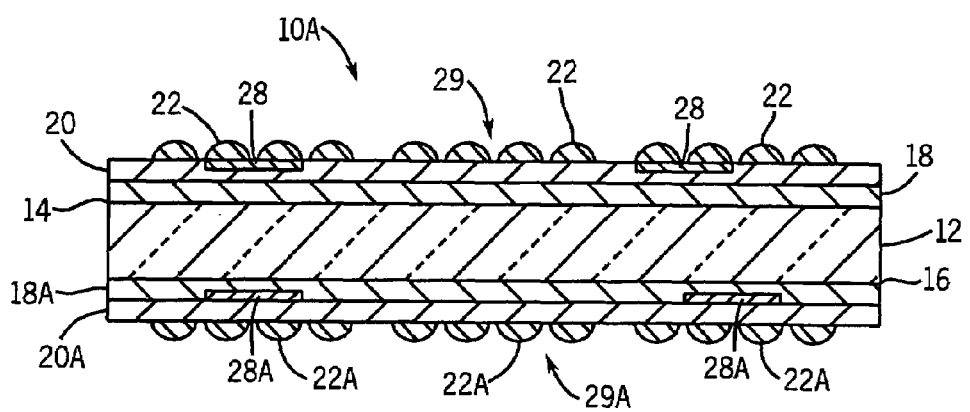
FIG. 1A is an enlarged cross-sectional view of the printed article in FIG. 1 with printing on both top and bottom surfaces of the printed article.

FIG. 1A illustrates the printed article 10 of FIG. 1 with printing on both the top 14 and bottom 16 surfaces of the substrate 12. The printed article 10A of FIG. 1A includes a second reflective layer 18A printed on the bottom surface 16 of the substrate 12, a second graphic design or image 20A printed over and/or around the second reflective layer 18A, and a second textured pattern 29A of lines 22A printed on the second graphic design or image 20A. The graphic design or image 20A may also include hidden or latent images 28A "lightly" printed within the design.

Figure 2:
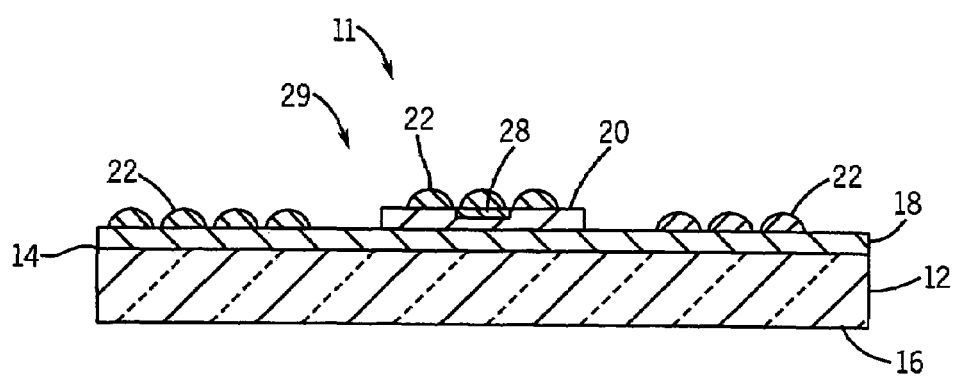
Figure 2A:
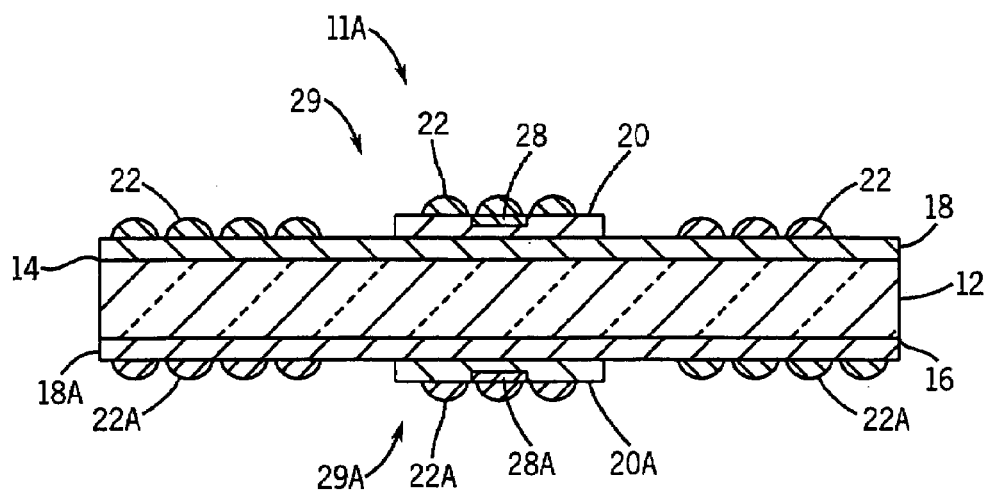
FIG. 2A is an enlarged cross-sectional view of the printed article in FIG. 2 with printing on both the top and bottom surfaces of the printed article.
Figure 3:
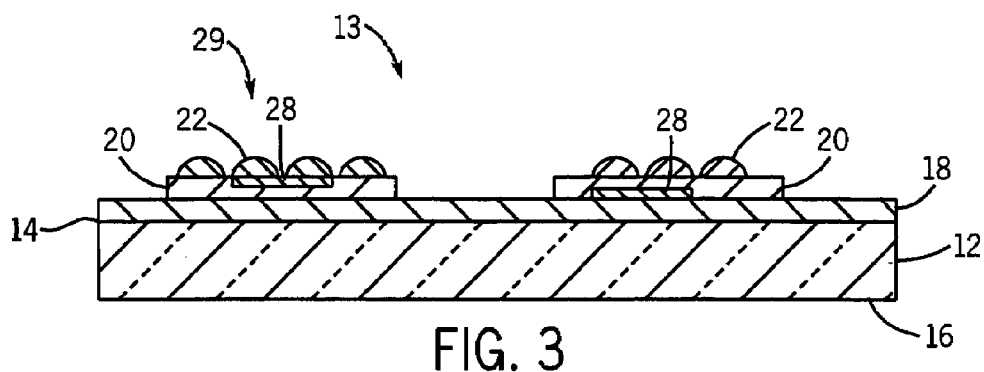
Figure 3A:
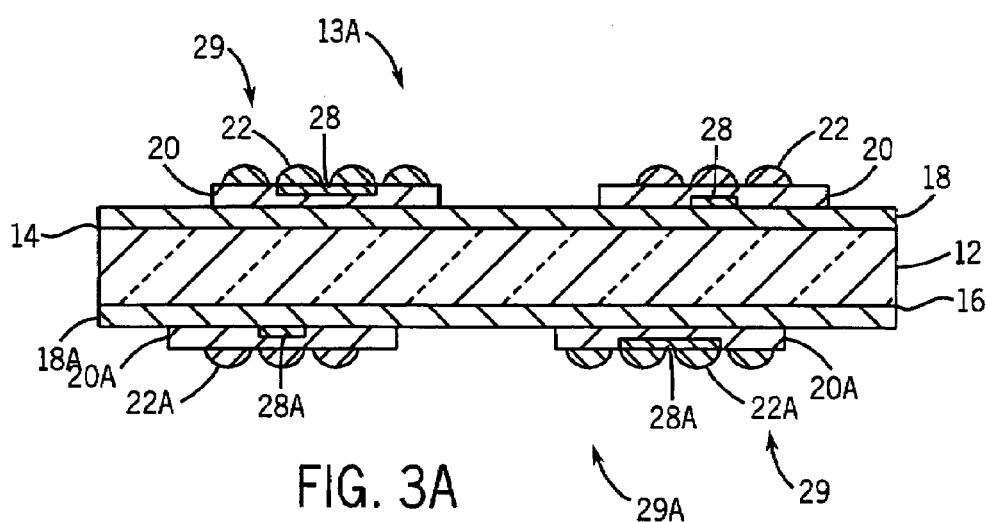
FIG. 3A is an enlarged cross-sectional view of the printed article in FIG. 3 with printing on both top and bottom surfaces of the printed article.
Figure 4:
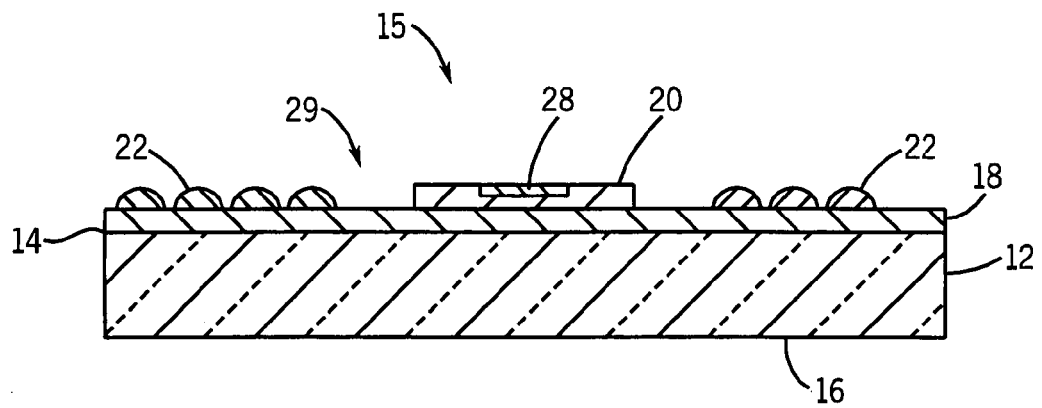
Figure 4A:
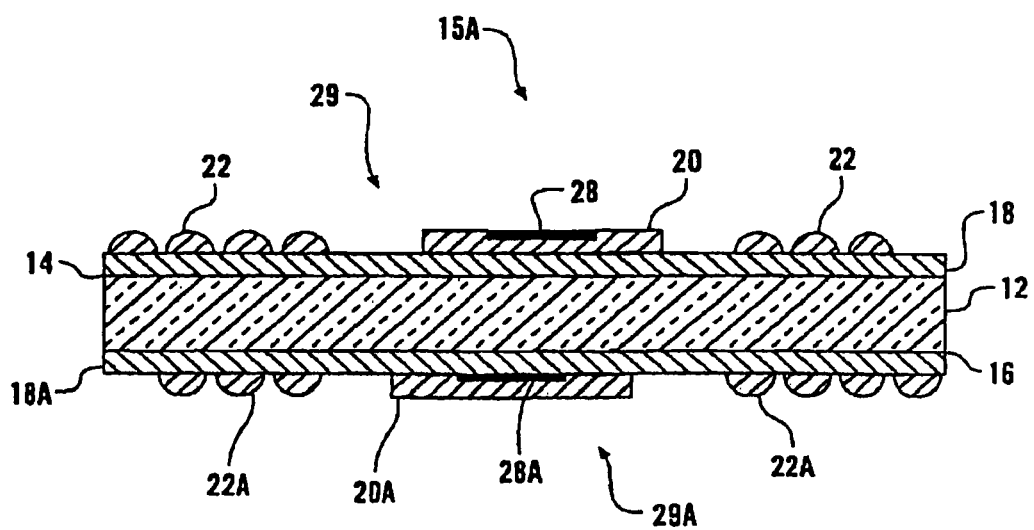
FIG. 4A is an enlarged cross-sectional view of the printed article in FIG. 4 with printing on both the top and bottom surfaces of the printed article.

FIGS. 2, 2A, 3, 3A, 4 and 4A show variations or modifications 11, 11A, 13, 13A, 15 and 15A of the first embodiment, as shown in FIGS. 1 and 1A. In FIGS. 2 and 2A, variations 11 and 11A include a graphic design or image 20, 20A printed on selected portions of a reflective layer 18, 18A with a textured pattern 29, 29A of lines 22, 22A printed on both the reflective layer 18, 18A and graphic image 20, 20A. In FIGS. 3 and 3A, variations 13 and 13A include a graphic design or image 20, 20A printed on selected portions of a reflective layer 18, 18A with a textured pattern 29, 29A of lines 22, 22A printed only on the graphic image 20, 20A. In FIGS. 4 and 4A, variations 15 and 15A include a graphic design or image 20, 20A printed on selected portions of a reflective layer 18, 18A with a textured pattern 29, 29A of lines 22, 22A printed only on the reflective layer 18, 18A. The graphic design or image layers 20, 20A may also include hidden or latent images 28, 28A "lightly" printed within the design.

Figure 5:
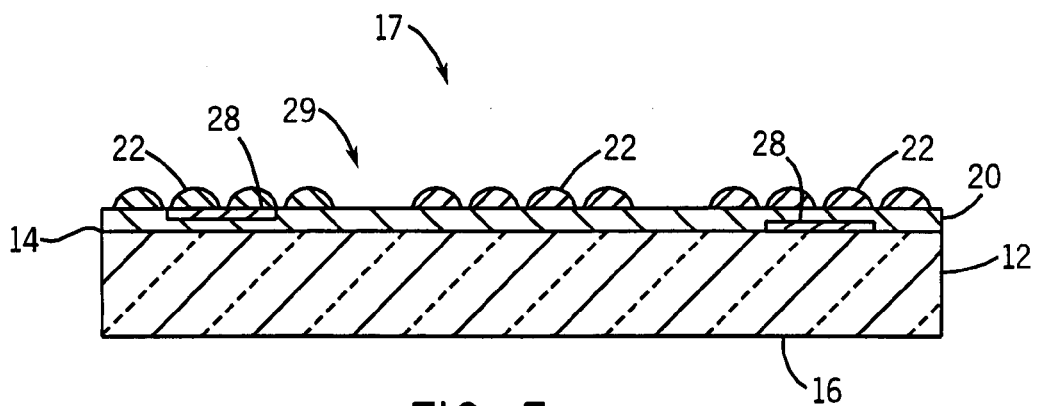

FIG. 5 illustrates an enlarged cross sectional view of a second embodiment of a printed article 17 produced in accordance with the present invention. The difference between this embodiment and the first embodiment is that this embodiment does not include a reflective layer printed on the surface of the substrate. Instead, a graphic design or image is printed directly on the surface of the substrate.

The printed article 17 includes a substrate 12 having a top surface 14 and a bottom surface 16. The substrate 12 may be formed of any suitable printable material. It is preferred that the top 14 and bottom 16 surfaces of the substrate 12 are substantially reflective or glossy.

A graphic design or image 20 is printed over all or a portion of the top surface 14 of the substrate 12. The graphic design or image 20 may comprise a plurality of ink layers having hidden or latent images 28 printed among the plurality of ink layers. These hidden or latent images 28 are "weak" or "lightly" printed images that are visible only at certain viewing angles. The graphic design 20 and hidden images 28 may be printed with opaque ink, semitransparent ink, translucent ink, or any combination thereof. The inks used are preferably UV curable inks.

A textured pattern 29 is printed over and/or around the graphic design or image 20. The textured pattern 29 includes a plurality of parallel convex rounded ridges or lines 22 of transparent ink printed in bands, rays or sections over and/or around the graphic design or image 20. In the preferred embodiment, the height and thickness of the lines is approximately 0.2 mils to 0.5 mils. However, the thickness, height and spacing of the lines may vary depending upon the particular application and desired visual effect. The textured pattern 29 can be formed over the entire surface of the image 20 or over only a portion thereof. The textured pattern 29 of lines 22 is preferably formed from a transparent ink, such as Nasdar 3527 or the like, printed on top of the graphic design or image 20 by a printing method such as silk screening, lithography, flexography, offset printing, gravure, coating or other known printing method. The transparent ink has rheological properties such that when it is applied, it flows into a semi-cylindrical or convex shape when viewed in cross-section. This transparent ink is also preferably a UV curable ink. The textured pattern 29 of lines 22 create the illusion of depth, three-dimensionality, appearing and disappearing images, and motion in the printed article 17 as it is viewed from different angles.

Figure 5A:
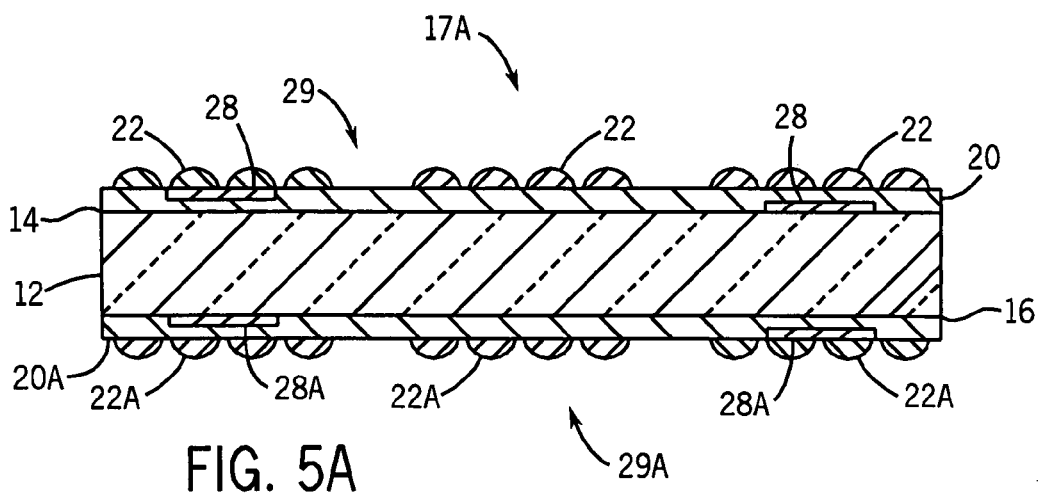
FIG. 5A is an enlarged cross-sectional view of the printed article in FIG. 5 with printing on both the top and bottom surfaces of the printed article.

FIG. 5A shows a printed article 17A similar to the printed article 17 of FIG. 5 with printing on both the top 14 and bottom 16 surfaces of the substrate 12. The printed article 17A includes a second graphic design or image 20A printed on the bottom surface 16 of the substrate 12 and a second textured pattern 29A of convex-shaped lines 22A printed on the second graphic design or image 20A. The graphic design or image 20A may also include hidden or latent images 28A "lightly" printed within the design.

Figure 6:
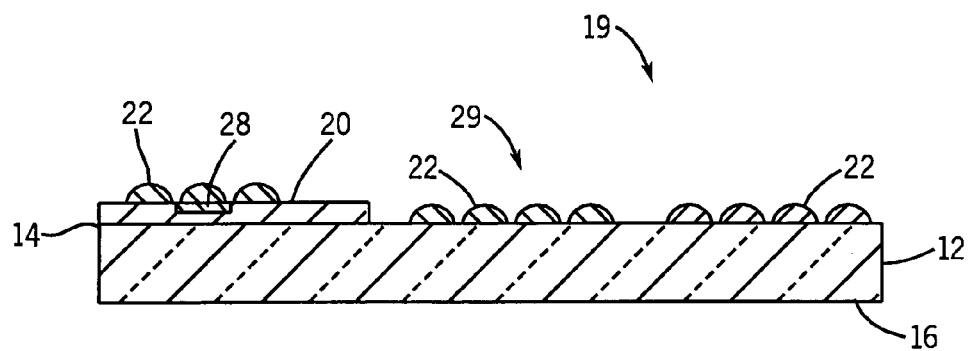
Figure 6A:
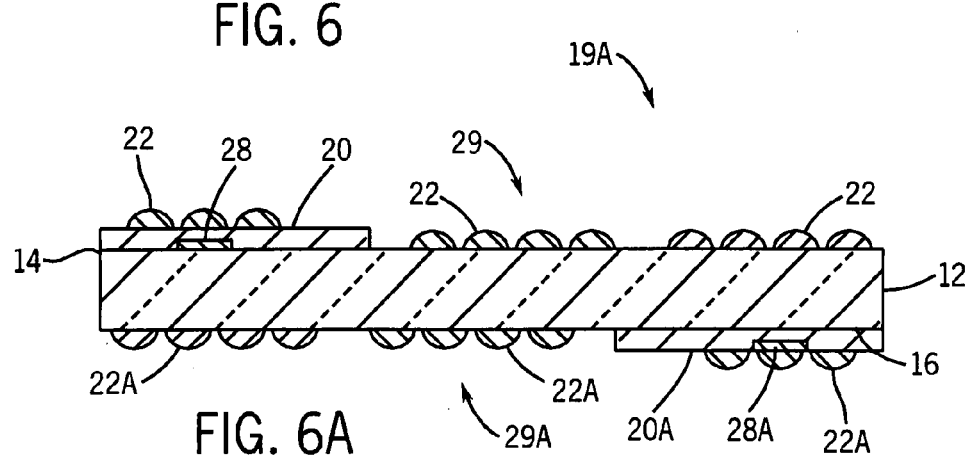
FIG. 6A is an enlarged cross-sectional view of the printed article in FIG. 6 with printing on both top and bottom surfaces of the printed article.
Figure 7:
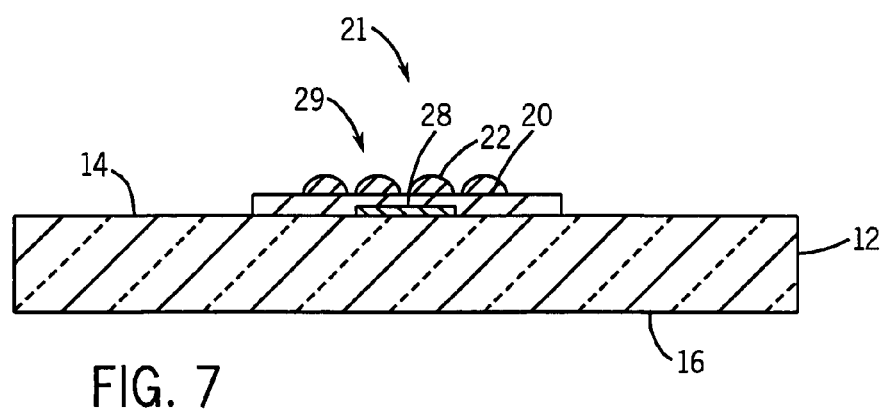
Figure 7A:
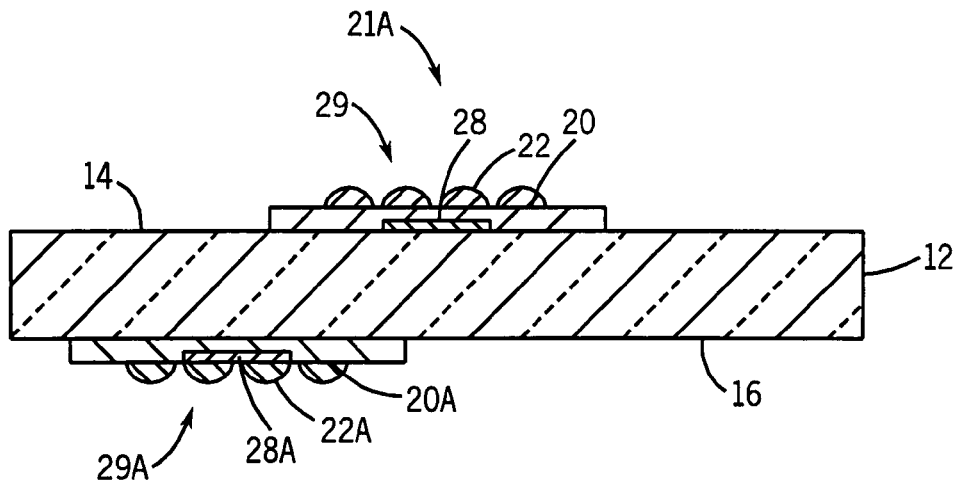
FIG. 7A is an enlarged cross-sectional view of the printed article in FIG. 7 with printing on both top and bottom surfaces of the printed article.
Figure 8:
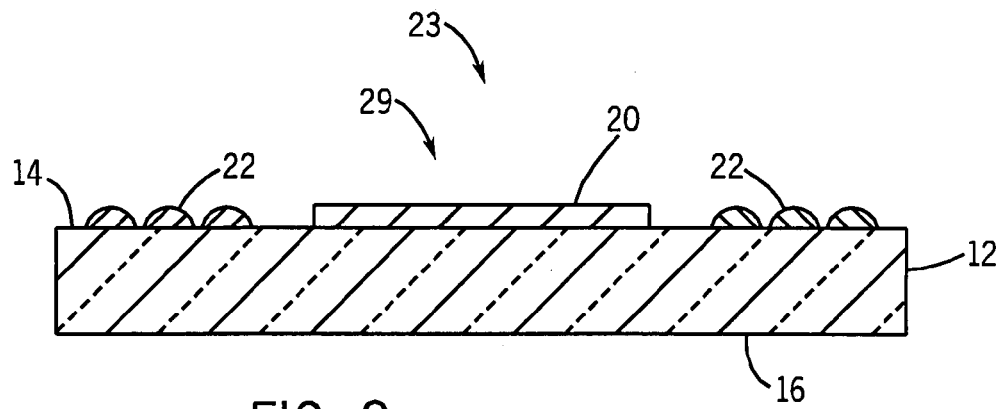
Figure 8A:
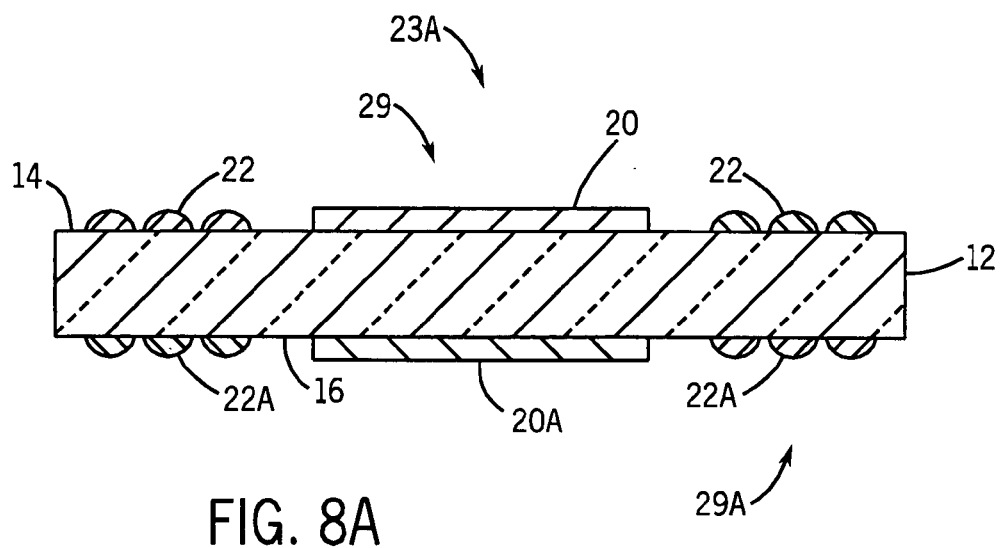
FIG. 8A is an enlarged cross-sectional view of the printed article in FIG. 8 with printing on both the top and bottom surfaces of the printed article.

FIGS. 6, 6A, 7, 7A, 8 and 8A show variations or modifications 19, 19A, 21, 21A, 23 and 23A of the second embodiment of FIGS. 5 and 5A. In FIGS. 6 and 6A, variations 19 and 19A include a graphic design or image 20, 20A printed on selected portions of the top 14 and bottom 16 surfaces of the substrate 12 with the textured pattern 29, 29A of lines 22, 22A printed on both the top 14 and bottom 16 surfaces of the substrate 12 and image 20, 20A. In FIGS. 7 and 7A, variations 21 and 21A include a graphic design or image 20, 20A printed on selected portions of the top 14 and bottom 16 surfaces of the substrate 12 with the textured pattern 29, 29A of lines 22, 22A printed only on the image 20, 20A. In FIGS. 8 and 8A, variations 23 and 23A include a graphic design or image 20, 20A printed on selected portions of the top 14 and bottom 16 surfaces of the substrate 12 and the textured pattern 29, 29A of lines 22, 22A printed only on the top 14 and bottom 16 surfaces of the substrate 12. The graphic design or image 20, 20A may also include hidden or latent images 28, 28A "lightly" printed within the design.

Figure 9:
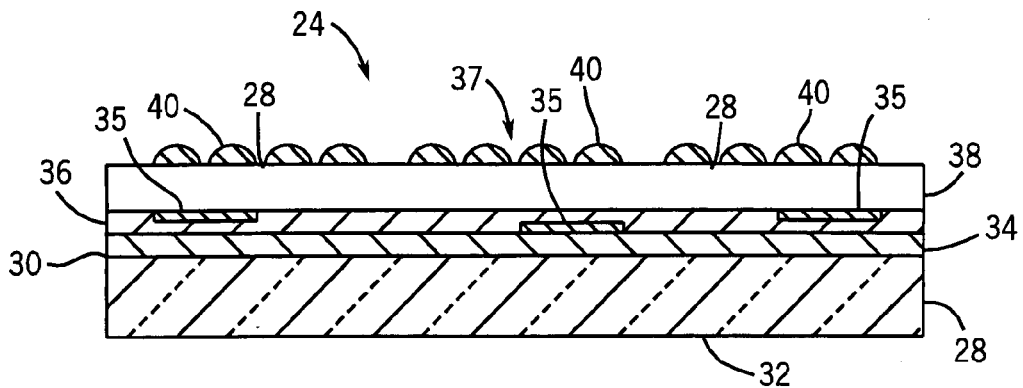

FIG. 9 illustrates an enlarged cross sectional view of a third embodiment of a printed article 24 produced in accordance with the present invention. The difference between this embodiment and the first embodiment is that this embodiment includes a transparent glossy layer printed between the graphic image and the textured pattern.

The printed article 24 includes a substrate 28 having a top surface 30 and a bottom surface 32. A reflective ink layer 34 is printed over all or a portion of the top surface 30 of the substrate 28. The reflective layer 34 is preferably formed of reflective ink which is printed on the substrate 28. The reflective ink can be opaque, transparent, semi-transparent or translucent to give the printed article 24 a shiny or glossy metallic appearance.

A graphic design or image 36 is printed over all or a portion of the reflective layer 34. The graphic design or image 36 comprises a plurality of ink layers that may include hidden or latent images 35 printed within the design. These hidden or latent images 35 are "weak" or "lightly" printed images that may be visible only at certain viewing angles. The graphic design 36 and hidden images 35 may be printed with opaque ink, semi-transparent ink, translucent ink, or any combination thereof. The inks used are preferably UV curable inks.

A transparent glossy layer 38 is printed over the image 36 and any exposed portion of the reflective layer 34. The transparent glossy layer 38 maybe formed of clear polyester by thermal lamination, or by printing or coating with a clear plastic or transparent ink. The glossy layer 38 can also be formed of a pressure sensitive sheet using cold lamination.

A textured pattern 37 is printed on top of the glossy layer 38. The textured pattern 37 includes a plurality of parallel convex ridges or lines 40 of transparent ink printed in bands, rays or sections over the glossy layer 38. In the preferred embodiment, the height and thickness of the lines is approximately 0.2 mils to 0.5 mils. However, the thickness, height and spacing of the lines may vary depending upon the particular application and desired visual effect. The textured pattern 37 can be formed over the entire surface of the glossy layer 38 or over only a portion thereof. The textured pattern 37 of lines 40 is preferably formed from a transparent ink, such as Nasdar 3527 or the like, printed on the glossy layer 38 by a printing method such as silk screening, lithography, flexography, offset printing, gravure, coating or other known printing method. The transparent ink has rheological properties such that when it is applied, it flows into a semi-cylindrical or other convex shape when viewed in cross-section. This transparent ink is also preferably a UV curable ink. The textured pattern 37 of lines 40 create the illusion of depth, three-dimensionality, appearing and disappearing images, and motion in the printed article 24 as it is viewed from different angles.

Figure 9A:
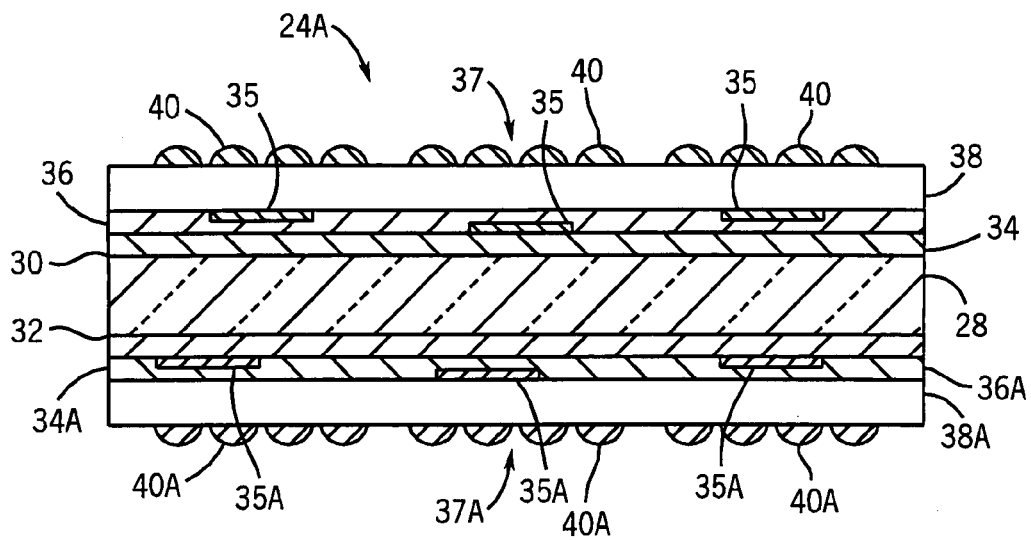
FIG. 9A is an enlarged cross-sectional view of the printed article in FIG. 9 with printing on both the top and bottom surfaces of the printed article.

FIG. 9A illustrates a printed article 24A similar to the printed article 24 of FIG. 9 with printing on both the top 30 and bottom 32 surfaces of the substrate 28. The printed article 24A includes a second reflective layer 34A printed on the bottom surface 32 of the substrate 28, a second graphic design or image 36A printed on the second reflective layer 34A, a second transparent glossy layer 38A printed on the image 36A and a second textured pattern 37A of lines 40A printed on the second transparent glossy layer 38A. The graphic design or image 36A may also include hidden or latent images 35A "lightly" printed within the design.

Figure 10:
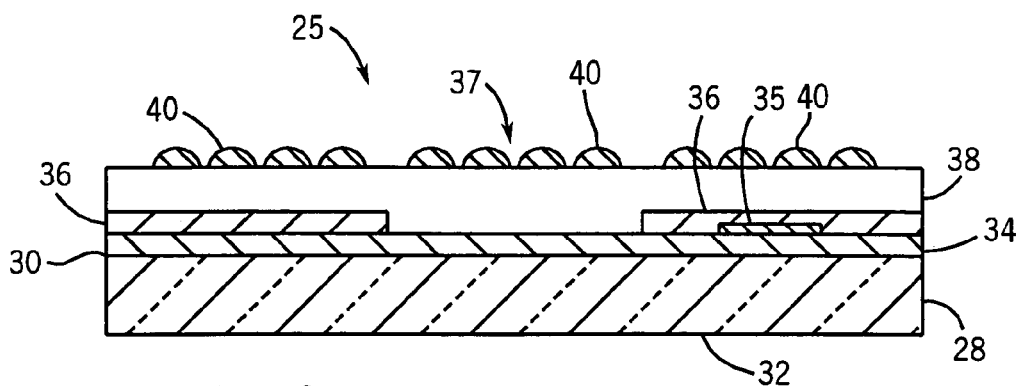
Figure 10A:
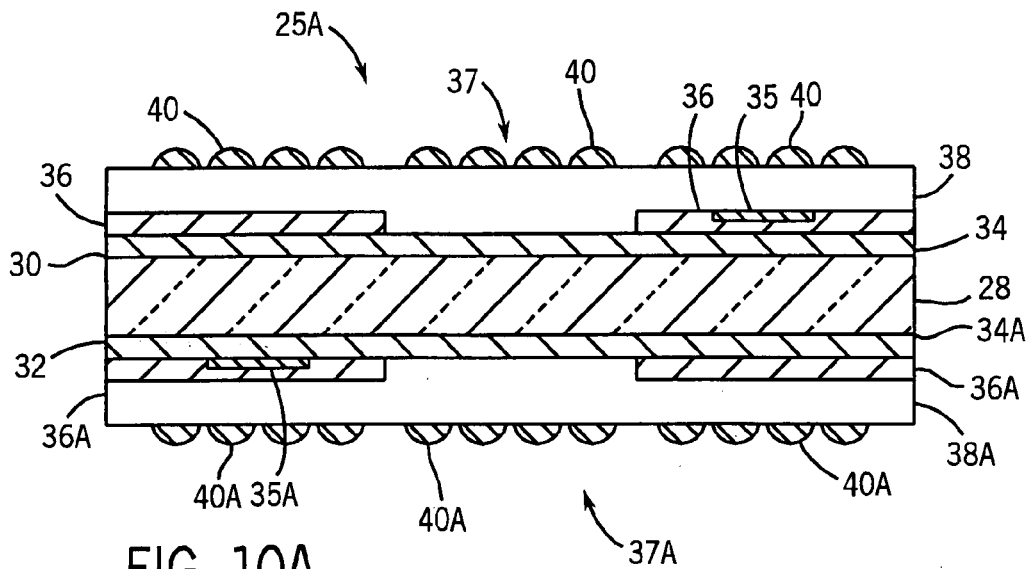
FIG. 10A is an enlarged cross-sectional view of the printed article in FIG. 10 with printing on both the top and bottom surfaces of the printed article.
Figure 11:
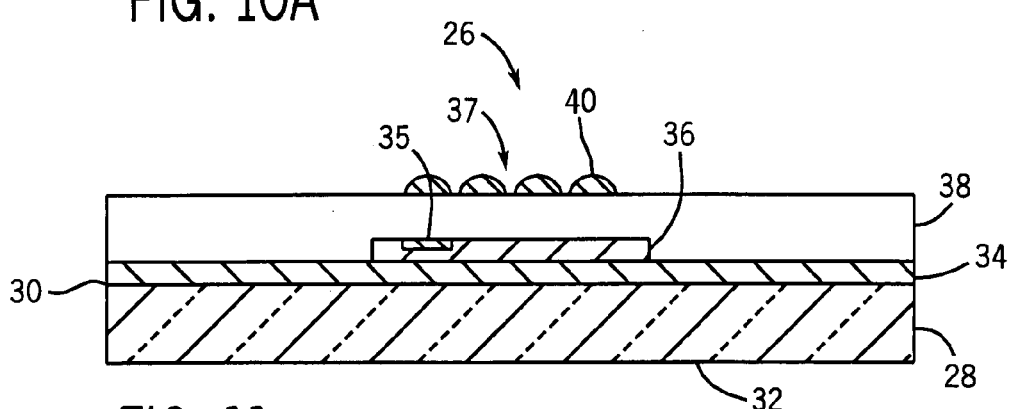
Figure 11A:
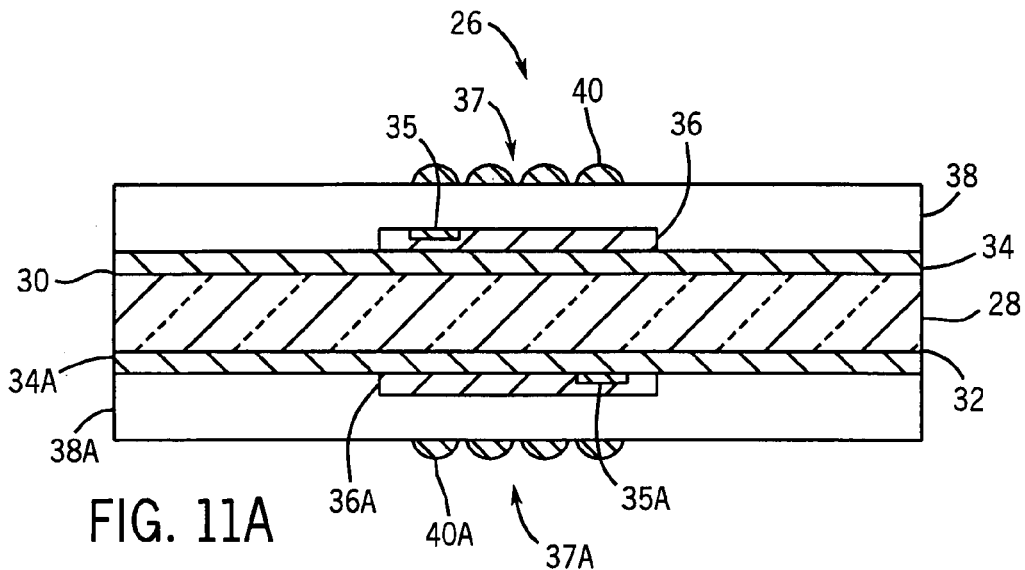
FIG. 11A is an enlarged cross-sectional view of the printed article in FIG. 11 with printing on both the top and bottom surfaces of the printed article.
Figure 12:
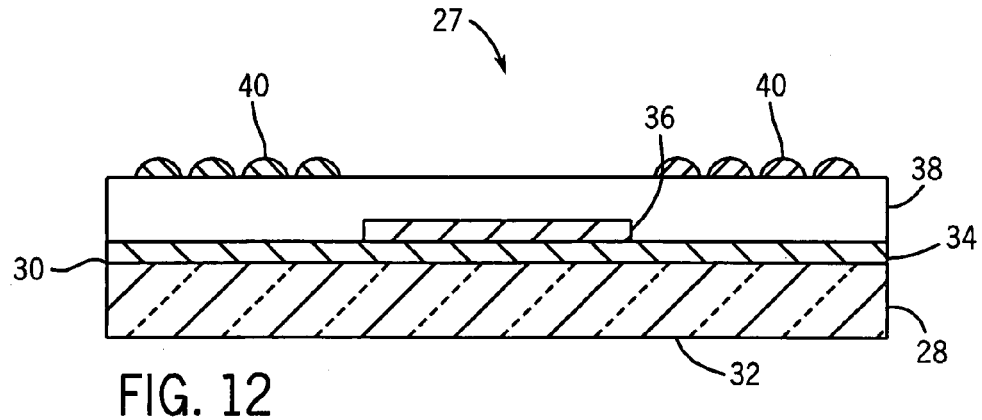
Figure 12A:
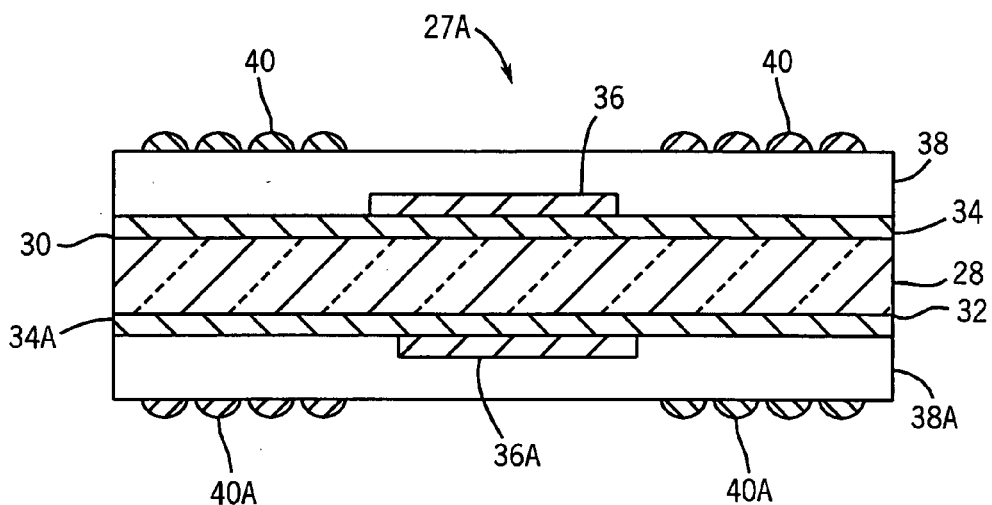
FIG. 12A is an enlarged cross-sectional view of the printed article in FIG. 12 with printing on both the top and bottom surfaces of the printed article.

FIGS. 10, 10A, 11, 11A, 12 and 12A show variations or modifications 25, 25A, 26, 26A, 27 and 27A of the third embodiment, as shown in FIGS. 9 and 9A. In FIGS. 10 and 10A, variations 25 and 25A include a graphic design or image 36, 36A printed on selected portions of a reflective layer 34, 34A with a textured pattern 37, 37A of lines 40, 40A printed on a transparent glossy layer 38, 38A over both the reflective layer 34, 34A and image 36, 36A. In FIGS. 11 and 11A, variations 26 and 26A include a graphic design or image 36, 36A printed on selected portions of a reflective layer 34, 34A with a textured pattern 37, 37A of lines 40, 40A printed on a transparent glossy layer 38, 38A only over the image 36, 36A. In FIGS. 12 and 12A, variations 27 and 27A include a graphic design or image 36, 36A printed on selected portions of a reflective layer 34, 34A with a textured pattern 37, 37A of lines 40, 40A printed on a transparent glossy layer 38, 38A over only the reflective layer 34, 34A. The graphic design or image 36, 36A may also include hidden or latent images 35, 35A "lightly" printed within the design.

Figure 13:
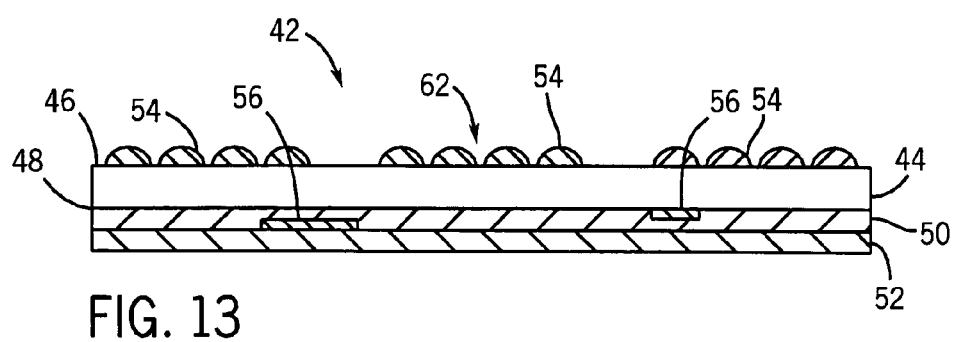

FIG. 13 illustrates an enlarged cross sectional view of a fourth embodiment of a printed article 42 produced in accordance with the '158 invention. The printed article 42 includes a clear or transparent substrate 44 having a top surface 46 and a bottom surface 48. A graphic design or image 50 is printed over all or a portion of the bottom surface 48 of the substrate 44. The graphic design or image 50 comprises a plurality of ink layers that may include hidden or latent images 56 printed within the design. These hidden or latent images 56 are "weak" or "lightly" printed images that may be visible only at certain viewing angles. The graphic design and hidden images 56 may be printed with opaque ink, semi-transparent ink, translucent ink, or any combination thereof. The inks used are preferably W curable inks. A reflective layer 52 is printed over all or a portion of the graphic image 50 on the bottom surface 48 of the substrate 44. The reflective layer 52 is preferably formed of reflective ink which can be opaque, transparent, semi-transparent or translucent to give the printed article 42 a shiny or glossy metallic appearance.

A textured pattern 62 is printed on the top surface 46 of the substrate 44. The textured pattern 62 includes a plurality of parallel convex ridges or lines 54 of opaque, semi-transparent, or translucent ink printed in bands, rays or sections on the top surface 46 of the substrate 44. In the preferred embodiment, the height and thickness of the lines is approximately 0.2 mils to 0.5 mils. However, the thickness, height and spacing of the lines may vary depending upon the particular application and desired visual effect. The textured pattern 62 can be formed over the entire top surface 46 of the substrate 44 or over only a portion thereof. The textured pattern 62 of lines 54 is preferably formed from an opaque, semi-transparent, or translucent ink, such as Flint RVW29129 or the like, printed on top of the substrate by processes such as silk screening, lithography, flexography, offset printing, gravure, coating or other known printing method. The ink has rheological properties such that when it is applied, it flows into a semi-cylindrical or other convex shape when viewed in cross-section. This ink is also preferably a UV curable ink. The textured pattern 62 of lines 54 create the illusion of depth, three-dimensionality, appearing and disappearing images, and motion in the printed article 42.

FIG. 14 illustrates an example, a sports trading card 56 manufactured in accordance with the '158 invention. The card 56 includes the image of a football player 58 printed over a reflective layer covering the entire top surface of the card. Printed around the image 58 is a plurality of textured lines 60 printed within a plurality of sections or rays 62 emanating from the image 58. The textured lines 60 are produced by transparent ink printed within the sections or rays 62. Each of the sections 62 includes a plurality of parallel lines 60 all oriented in the same direction to illuminate the entire section 62 when light is reflected from the reflective layer through the textured pattern of lines 60 when the card 56 is viewed at different angles. Adjacent sections 62 have lines 60 oriented in different directions to reflect the light in different directions as the card 56 is viewed from different angles. The invention also contemplates sections 62 not having a textured pattern of lines 60, but a layer of translucent ink covering the reflective layer creating a flat appearance. The different sections 62 of textured patterns of lines 60 creates the illusion. of depth, three-dimensionality, appearing and disappearing images, and motion in the printed sports trading card 56.

Figure 15:
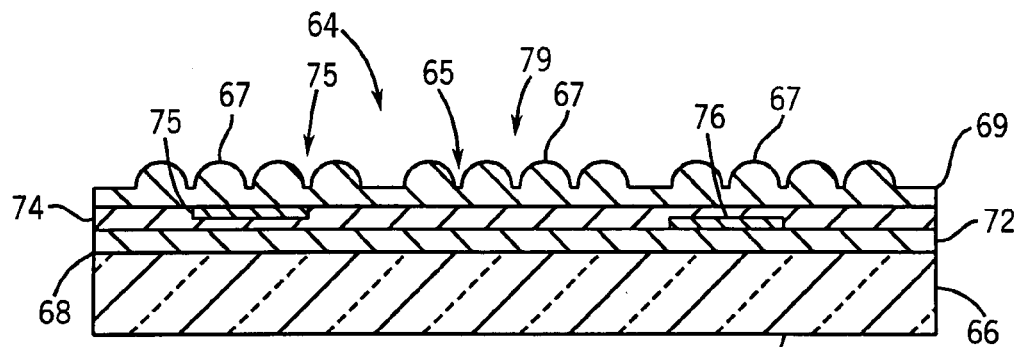

FIG. 15 illustrates an enlarged cross-sectional view of an embodiment of a printed article, similar to the embodiment shown in FIG. 1. The printed article 64 preferably includes a substrate 66 having a top surface 68 and a bottom surface 70. A reflective layer 72 is preferably applied over all or a portion of the top surface 68 of the substrate 66. A graphic design or image 74 is preferably applied over all or a portion of the reflective layer 72. The graphic design or image 74 may comprise a plurality of layers in order to provide the desired design. The graphic design 74 may also include hidden or latent images 28 printed within the design. A clear plastic layer 69 is then preferably applied over and/or around the graphic design or image 76. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the image 76 or over only a portion thereof. The textured pattern 79 preferably includes a plurality of parallel lines 67 stamped into bands, rays or sections 60 over the image 76 to create the same visual effect as described above.

Figure 16:
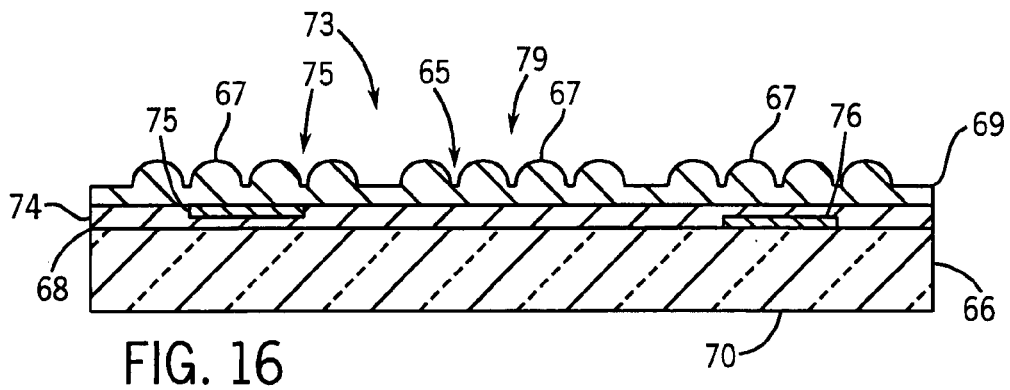

FIG. 16 illustrates an enlarged cross-sectional view of an embodiment of a printed article, similar to the embodiment shown in FIG. 5. The printed article 73 includes a substrate 66 having a top surface 68 and a bottom surface 70. A graphic design or image 74 is applied over all or a portion of the top surface 68 of the substrate 70. The graphic design or image 74 may comprise hidden or latent images 76. A clear plastic layer 69 is then preferably applied over and/or around the graphic design or image 76. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the image 76 or over only a portion thereof. The textured pattern 79 preferably includes a plurality of parallel lines 67 stamped into bands, rays or sections 60 over the image 76 to create the same visual effect as described above.

Figure 17:
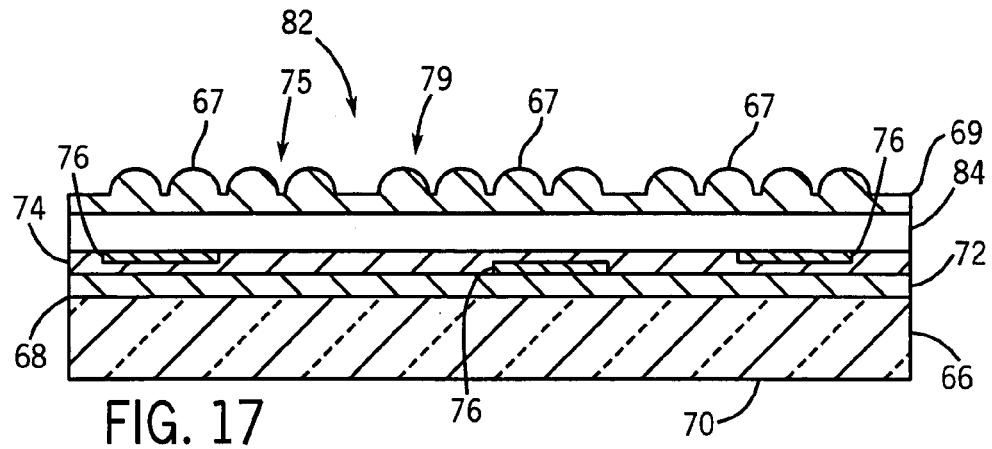

FIG. 17 illustrates an enlarged cross-sectional view of an embodiment of a printed article 82, similar to the embodiment shown in FIG. 9. The printed article 82 includes a substrate 66 having a top surface 68 and a bottom surface 70. A reflective ink layer 72 is preferably applied over all or a portion of the top surface 68 of the substrate 70. A graphic design or image 74 is preferably applied over all or a portion of the reflective layer 72. The graphic design or image 74 may include hidden or latent images 76 incorporated within the design. A transparent glossy layer 84 is preferably applied over the image 74 and any exposed portion of the reflective layer 72. A clear plastic layer 69 is then preferably applied over and/or around the graphic design or image 76.

This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the image 76 or over only a portion thereof. The textured pattern 79 preferably includes a plurality of parallel lines 67 stamped into bands, rays or sections 60 over the image 76 to create the same visual effect as described above.

Figure 18:
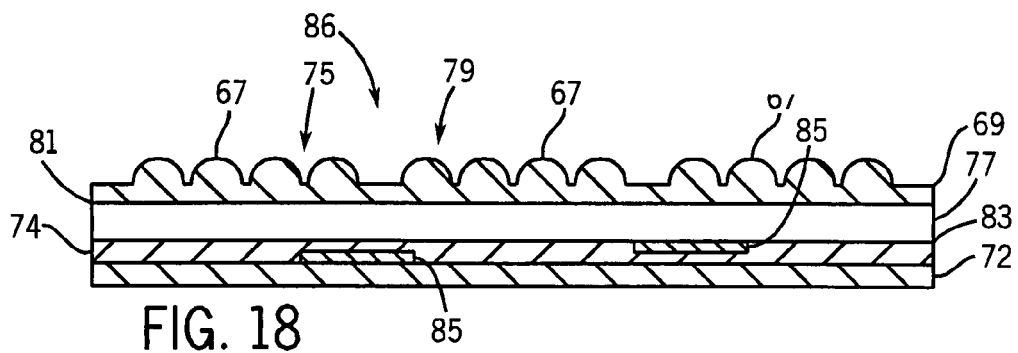

FIG. 18 illustrates an enlarged cross-sectional view of an embodiment of a printed article 86, similar to the embodiment shown in FIG. 13. The printed article 86 preferably includes a clear or transparent substrate 77 having a top surface 81 and a bottom surface 83. A graphic design or image 74 is preferably applied over all or a portion of the bottom surface 81 of the substrate 77. The graphic design or image 74 may include hidden or latent images 85 printed within the design. A reflective layer 72 is preferably applied over all or a portion of the graphic image 74 on the bottom surface 83 of the substrate 77. A clear plastic layer 69 is then preferably applied over and/or around the graphic design or image 76. This clear plastic layer is preferably a clear plastic laminate that is impressed, stamped, embossed or otherwise formed with a plurality of light controlling lines or lenses 79 that are semi-circular in cross-section. This textured pattern of lines 79 can be formed over the entire surface of the image 76 or over only a portion thereof. The textured pattern 79 preferably includes a plurality of parallel lines 67 stamped into bands, rays or sections 60 over the image 76 to create the same visual effect as described above.

'172 application

As illustrated in FIG. 19, a display is provided by printed article 110 having a visual display formed thereon which is manufactured in accordance with a method of the '172 invention. The article 110 includes a base sheet 112 which can be opaque or transparent, and flexible or rigid.

An opaque sheet 112 can be formed of paper, cardboard, metal, or any other suitable material. An opaque sheet is appropriate for producing trading cards, greeting cards, signs, posters, labels, book covers, decorative panels, name plates, and the like. Alternatively, the sheet 112 can be replaced by an object having a flat surface, such as the side of a building.

A transparent sheet 112 can be formed of plastic, glass, or any other suitable material. A transparent sheet is appropriate for producing details and the like, and can also be used for producing other items with a rear surface reflective layer and protective cover, in addition to a front surface reflective layer and protective cover, to be described.

An opaque sheet 112 is preferably formed from board or paper stock that is between 8.0 and 30.0 mils thick, although thicker or thinner stock may be used where the application requires. In applications such as trading cards, stock that is approximately 10.0 mils thick is typically used. The board or paper stock should be treated with a moisture stable coating that will prevent ink from being absorbed by the stock.

For applications where greater flexibility is required, such as decals, the base may be relatively thin or composed of a flexible plastic material. Conversely, thicker stock and rigid plastic may be used in applications where rigidity is required, such as free standing displays.

The base sheet 112 has a front surface 112a which is typically flat, although the invention is not so limited. An adhesive pattern 115 is formed on surface 112a. For those applications where height, depth and dimension is desired, pattern 115 is textured and has a varying thickness with a plurality of thicker portions providing protrusions 115a and a plurality of thinner portions providing recesses 115b. The protrusions and recesses are in the form of lines, circular bumps, or any other suitable design. The thickness (height) of protrusions 115a is approximately 1.0 to 1.5 mils to ensure visibility, and the thickness of recesses 115b is approximately 0.2 to 0.5 mils, though the thickness may be made larger or smaller to suite particular applications. The adhesive pattern layer 115 is formed over base 112 using screen printing, offset printing, or any other suitable process, including other types of printing or other methods such as hand painting. An appropriate adhesive is Rage 800 Clear Ink which is commercially available from Nazdar of Chicago, Ill.

A reflective layer 118 is formed on adhesive 115, such that reflective layer 118 is adhered to the pattern thereof. Reflective layer 118 is preferably formed on monochrome (e.g. solid chrome) or holographic roll leaf. The roll leaf foil is typically secured to a carrier, such as a polyester film, with a release layer therebetween. Adhesive pattern 115 is preferably a heat activated adhesive. Pressure (as well as heat, if adhesive 115 is heat activated) is applied to bond the roll leaf to the pattern 115. The carrier is then removed. The roll leaf used to form reflective layer 118 is different from conventional roll leaf in that it does not have an adhesive on its exposed surface. Instead, the adhesive is provided by pattern 115. Although the carrier with the roll leaf thereon is provided as a continuous sheet, the reflective foil layer thereon is transferred from the carrier to the pattern 115 only where the adhesive is present, to form the reflective layer 118. Roll leaf in areas in which the adhesive is not present remains attached to the carrier. A suitable monochrome roll leaf material is MEZ 5900 Chrome, which is commercially available from Astor Universal of Lenexa, Kans., and is applied using any conventional laminating technique which is available in the art for applying roll leaf. A suitable reflective holographic roll leaf is SEZ 5995 Chrome Rainbow Holographic, which is also commercially available from Astor Universal. Gold reflective and holographic roll leaf, as well as other types and colors of roll leaf, are also commercially available and are suitable for practicing the present invention. Although roll leaf is the preferred material for forming the reflective layer 118, the invention is not so limited, and any other suitable material can be used to form the reflective layer 118. In some instances, some of the release coat will remain on the exposed surface of the roll leaf. As such, a primer (not shown) can be applied to the roll leaf to ensure that a subsequently applied ink image will stick to it. The primer may be water-based, UV curable, or conventional, and may be applied by lithography, silk-screening, or flexography. As a result, the surface of the reflective layer 118 follows the surface of pattern 115, and if the latter is textured, the portions of the reflective layer 118 overlying the protrusions 115a are raised above the neighboring areas 115b of the pattern 115. This produces an embossed effect which simulates a three-dimensional image.

Further illustrated in FIG. 19 are the results of performing a step of forming an ink image 120 on the surface 112a in an area not occupied by pattern 115. The image 120 can include opaque ink, at least partially transparent or translucent ink, or any combination thereof. As illustrated, the ink image 120 includes an area 120a formed of at least partially transparent or translucent ink, and an area 120b formed of opaque ink on the surface 112a. Typically, the image 120 will be formed using a conventional four-color printing process, using inks of three primary colors in combination with black ink. Suitable printing processes include lithography, silk-screening, and gravure. The image 120 can further include an area 120*c* of at least partially transparent or translucent ink formed on the opaque area 120*b* and/or an area 120*d* of opaque ink formed on the transparent area 120*a*. The portion of the transparent ink area 120*a* underlying the opaque ink area 120*d* is not visible to the viewer, but may be included to simplify the printing of the entire image 120. The opaque area 120*d* can be white to enhance the simulated depth effect. It is further within the scope of the invention to form transparent ink images on top of other transparent ink images, and opaque images on top of other opaque images, if doing so simplifies the printing process. The opaque ink areas 120*b* and 120*d* present a conventional flat, two-dimensional appearance to the viewer. The transparent area 120*c* may be tinted with a color which is different from the underlying opaque area 120*b*, such that the colors of the areas 120*c* and 120*b* combine to produce a third color.

The base sheet 112 can be opaque, with the surface 112*a* being white or of any other suitable color. Light passing through the portion of the transparent ink area 120*a* which is not covered by the area 120*d* will be reflected back to the viewer, and the color of this portion of the area 120*a* will be a combination of the color of the tinting of the area 120*a* and the color of the surface 112*a*. In this arrangement, the transparent areas of the image 120 produce a different visual effect from the opaque areas of the image 120.

An opaque base sheet 112 can be formed of card stock having a white reflective front surface 112*a*. In this case, a white shiny image area can be provided by the surface 112*a* itself without the necessity of printing the ink image 120 in this area. In an exemplary case of an image having a large white background, substantial economy can be realized by not having to print ink in the background area.

In the arrangement of FIG. 19, it is within the scope of the invention to form pattern 115 and reflective layer 118 first, and then form the ink image 120. Alternatively, the ink image can be formed first, and then the pattern 115 and reflective layer 118.

FIG. 20 illustrates a variation of the method of FIG. 19, in which an ink image 120' is formed first, and the pattern 115 and reflective layer 118 are formed subsequently. Like elements are designated by the same reference numerals used in FIG. 19, where corresponding but modified elements are designated by the same reference numerals primed. In this case, the overall processing may be facilitated by forming the ink image 120' over all or part of the surface 112*a*, and then forming the pattern 115 and reflective layer 118 over all or part of the image 120'. As shown, a portion of the opaque layer 120*b*' extends under the right portion of the pattern 115. Thus, pattern 115 is formed in a first area, the ink image 120' is formed in a second area, and the pattern 115 and image 120' overlap in a third area which is coextensive with the first area.

The method of the '172 invention can further include forming an additional ink image 122 over part or all of the roll leaf foil reflective layer 118 as illustrated in FIG. 21. The image 122 as shown includes a transparent area 122*a* which is formed over the left portion of the reflective layer 118 and the left portion of the ink image 120, a transparent area 122*b* which is formed over part of the right portion of the reflective layer 118, and an opaque area 122*c* which is formed over the right portion of the reflective layer 118. The portion of the reflective layer 118 underlying the opaque area 122*c* will not be visible to a viewer. It is further within the scope of the invention to form the additional image 122 as including multiple layers as illustrated in FIG. 20, and to form transparent ink areas over opaque ink areas.

FIG. 22 further illustrates a protective transparent layer 124 which is formed over the reflective layer 118, image 120, and any exposed portions of the surface 112*a*. The layer 124 as illustrated is sufficiently thick that the method can further comprise planarizing the layer 124 in any known manner so that the exposed surface thereof is flat.

FIG. 23 illustrates an alternative transparent layer 124' which is thinner than the layer 124, and does not have a planar exposed surface. Instead, the exposed surface follows the underlying pattern 115 such that portions of the surface which overlie the protrusions 115*a* (in the case of a textured adhesive pattern 115) are raised to enhance the embossing effect.

The transparent layer 124 or 124' can be formed of any suitable material. Exemplary materials include transparent ink (either water-based, UV curable, or conventional solvent evaporative), catalysts and resin systems which produce a hard finish, and polyester, polyethylene, or polystyrene sheets. Transparent ink and catalyst and resin systems may be applied with a coater, by screen printing, spray painting, or using any other commercially available method, while the polyester sheet may be secured with a clear adhesive. The thickness of transparent layer 124 or 124' may be varied in order to achieve the desired surface texture and appearance. If a relatively thin (approximately 1.0 to 2.0 mils) transparent layer 124 is employed, the top surface of the finished product will have a texture that corresponds to that of the textured pattern 115 as illustrated in FIG. 23. A thicker (approximately 10.0 mils) transparent layer 124 gives the finished product the appearance of depth as illustrated in FIG. 22. If the layer 124 is sufficiently thick, it will not require a subsequent planarization step to produce a flat exposed surface. The thickness of a transparent layer 124 or 124' applied with coaters may be varied by varying the number of coating layers applied. The thickness of a polyester sheet transparent layer will vary with the thickness of the sheet and the clear adhesive (either heat activated or pressure sensitive) which secures the sheet to the pattern 115 and image 120. For example, the adhesive layer (not shown) may be as thin as 1.2 mils and the polyester sheet may be as thin as 0.25 mils, for a combined thickness of approximately 1.5 mils. Thicknesses of approximately 10.0 mils may be achieved with a 2.0 mil sheet and 8.0 mils of adhesive, with a 7.0 mil sheet and 3.0 mils of adhesive, and with all combinations therebetween.

FIGS. 22 and 23 illustrate a layer 126 which is formed on a rear surface 112*b* of the base sheet 112, and a protective transparent layer 128 which is formed over the layer 126. It will be noted that the layers 124, 124', 126, and/or 128 can be applied to the embodiments above or variations thereof. If sheet 112 is transparent, the layer 126 can be an opaque layer of any color or pattern, or a shiny reflective or holographic layer. Where the layer 126 is opaque, it can provide a rear side ink image which is visible by viewing the sheet 112 from the front surface 112*a* or from the rear surface 112*b*, or from both surfaces. The layer 126 is visible through any transparent areas of the image 120. If the layer 126 is opaque, the color of the transparent areas of the image 120 will be a combination of any tinting of the transparent areas and the color of the layer 126. If the layer 126 is reflective, the color of the transparent areas will be the color of the tinting, with a shiny metallic appearance to enhance the simulated depth effect. It is further within the scope of the '172 invention to omit the reflective layer 126 in one or more areas to produce a clear or color tinted appearance which can be back lit.

A preferred application of a visual display including an opaque base sheet 112 is a trading card, in which case the base sheet 112 will be made of cardboard or other suitable board stock. The front surface 112a of the sheet 112 will be white, or be of any other suitable color or pattern of colors. The layer 126 formed on the rear surface 112b will be a rear side ink image which is typically formed by printing. A suitable process for forming the rear side ink image is four-color lithography. In this manner, images can be formed on both sides of the sheet 112 without resorting to lamination.

An exemplary football trading card 130 is illustrated in FIGS. 24 to 26. FIG. 24 illustrates a front side 130a of the card 130 which has a textured image and an ink image formed thereon in the manner described above with reference to FIG. 19. FIG. 25 illustrates the rear side 130b of the card 130 which has an ink image printed thereon as described above with reference to FIGS. 22 and 23. The front side 130a of the card 130 includes a picture of a player 132 named Steve Chopp, whereas Steve's biographical data and statistics are printed on the rear side 130b of the card 130. As viewed in FIG. 24, the player 132 is wearing a uniform 134 and a helmet 136 and holding a football 138. Further visible is sky 140 and grass 142. The front side 130a of the card 130 is formed by printing a textured pattern corresponding to the football 138 and other areas which are to be accentuated by simulated embossing. As illustrated in FIG. 26, the textured pattern of the football 138 typically comprises a plurality of distributed circular protrusions or bumps 140, and continuous protrusions 142 which depict the seams of the football 138. Continuous linear protrusions 115a of adhesive pattern 115 are also formed to accentuate items such as portions 134a and 134b of the uniform 134, and shoelaces 134c as viewed in FIG. 24. After the textured pattern including the circular bump protrusions 140 and continuous protrusions 142, 134a to 134c have been formed on front side 130a of the card 130, roll leaf is applied to the textured areas as described above. Then, an ink image is formed on the front side 130a of the card 130, except for background and other areas which are to be constituted by the white or other colored surface of the front side 130a itself. For example, all areas except for the helmet 136 and football 138 can be formed of opaque ink, whereas transparent or translucent ink will be applied over the helmet 136 and football 138. Thus, the helmet 136 and football 138 will have a shiny appearance to simulate depth, whereas the football 138 and other textured areas will appear embossed to further enhance the simulated depth effect. It is further within the scope of the invention to apply roll leaf to areas of the image which are not textured to provide flat, reflective image areas. Reflective and/or opaque ink can be selectively applied to portions of these areas as described above. A protective transparent layer such as illustrated in FIG. 22 or 23 can be formed on the side 130a if desired. The players data is printed on the rear side 130b of the card 130 using a conventional lithographic or other suitable process in a separate operation. The rear side 130b can be printed before or after forming the front side 130a.

The '172 invention provides a method for producing a printed or similarly produced article, which overcomes the drawbacks of the prior art, and enables a pseudo three-dimensional visual display comprising a textured pattern including monochrome or holographic roll leaf to be formed on a surface of a base sheet which can be opaque as well as transparent. The '172 invention enables a two-sided article, such as a trading card, poster, decal, or sign, to be produced by printing an image on the side of the sheet opposite that which supports the pattern 115. This eliminates the need to laminate two separately printed articles to one another.

The '172 invention provides an image display 110, 130 including a base 112 having a front surface 112a, an adhesive pattern 115 formed over a first area of front surface 112a, a reflective layer 118 formed over the adhesive pattern 115, and an image 120 formed over a second area of the front surface 112a which is at least partially not occupied by the reflective layer 118. Reflective layer 118 is preferably a reflective foil layer transferred from a roll leaf. Adhesive pattern 115 is preferably heat activated adhesive. The reflective foil layer is transferred only to pattern 115 over the noted first area where heat activated adhesive is applied. In one form, adhesive pattern 115 is a textured pattern, and the adhesive pattern and the textured pattern are the same, i.e. a single layer textured adhesive coating of varying thickness. The textured adhesive pattern of varying thickness has a plurality of thicker portions providing protrusions 115a, and a plurality of thinner portions providing recesses 115b, wherein the reflective layer 118 is formed over protrusions 115a and over recesses 115b. In a further embodiment, FIG. 20, the noted first and second areas overlap in the noted third area, and adhesive pattern 115 and reflective layer 118 are formed over image 120b' in such third area.

The '172 invention provides a method for making an image display 110, 130 by providing a base 112 having a front surface 112a, forming an adhesive pattern 115 over a first area of the front surface 112a, forming a reflective layer 118 over the adhesive pattern 115, and forming an image 120 over a second area of the front surface 112a which is at least partially not common with the noted first area. Adhesive pattern 115 is preferably formed of heat activated adhesive, and reflective layer 118 is preferably formed by transferring a reflective foil layer from a roll leaf by heat and pressure. The reflective foil layer is transferred to pattern 115 only over the noted first area at the noted heat activated adhesive pattern. The embodiment of FIG. 20 involves overlapping the noted first and second areas at the noted third area, forming the image 120b' over the second area prior to forming adhesive pattern 115 and reflective layer 118, and then forming adhesive pattern 115 and reflective layer 118 over the image 120b' in the noted third area.

In one form of the method of the '172 invention, the method involves applying as a single coating layer a textured heat activated adhesive pattern 115 of varying thickness on a first area of front surface 112a of base 112, eliminating a textured pattern layer separate from an adhesive layer.

In a preferred manufacturing step, the noted reflective foil layer is transferred by using a heated resiliently conformable roller 150, FIG. 27, preferably a rubber roller. The heated resiliently conformable roller resiliently compresses at protrusions 115a and resiliently conforms to recesses 115b.

The '172 invention provides a method for improving economy of manufacture of the image display by combining the texture pattern layer and the adhesive layer as a single coating formed with varying thickness in a pattern of a plurality of thicker portions providing protrusions 115a and a plurality of thinner portions providing recesses 1±5b.

In various embodiments, image 120 may optionally be deleted, whereby there is no image, or the image is provided by the reflective layer 118 and its pattern.

Present Invention

FIG. 28 shows a second surface micromotion display 200 including a see-through substrate base 202, e.g. clear, transparent, translucent, or the like, having a first surface 204, defined in the art as a front surface facing a viewer 206, and having a second surface 208, defined in the art as a rear surface opposite to the front surface and facing away from the viewer. An image layer 210 may be formed over second surface 208 for desired graphics. A micromotion textured pattern 212 is formed over second surface 208, and over image 210 if used. A reflective layer 214 is provided over micromotion textured pattern 212 such that the illusion of motion is viewable through base 202 as reflected from reflective layer 214 through micromotion textured pattern 212, as shown at the reflected light rays 216. Base 202, image 210, micromotion textured pattern 212, and reflective layer 214 are comparable to the above-noted layers 12, 20, 22, 18, respectively, and in one embodiment are preferably of the same respective materials. Micromotion textured pattern 212 is preferably parallel lines in sections, as described above.

Reflective layer 214 is spaced from second surface 208 by micromotion textured pattern 212 therebetween, and also by image 210 therebetween if used. Micromotion textured pattern 212 has a plurality of convex shaped protrusions 218. Reflective layer 214 conforms to the convex shaped protrusions, such that the reflective layer has convex surfaces 220 facing away from second surface 208, and has concave surfaces 222 facing toward second surface 208. Light passing through base 202 is reflected by concave surfaces 222 back through base 202 to the viewer 206 as shown at reflected light rays 216. When graphics afforded by an image layer are desired, image layer 210 is formed over second surface 208, and reflective layer 214 is spaced from second surface 208 by image 210 and micromotion textured pattern 212 therebetween.

FIG. 29 shows a further embodiment and uses like reference numerals from above where appropriate to facilitate understanding. An opaque layer 224 is printed between selected portions of image 210 and micromotion textured pattern 212 and blocks light transmission therethrough. Opaque layer 224 includes a section 226 between image 210 and reflective layer 214, with no portion of micromotion textured pattern 212 between image 210 and reflective layer 214. Opaque layer 224 includes a section 228 between second surface 208 and reflective layer 214, with no portion of micromotion textured pattern 212 and no portion of image 210 between second surface 208 and reflective layer 214. Opaque layer 224 includes a section 230 between image 210 and micromotion textured pattern 212. In one embodiment, opaque layer 224 is glossy white, adding dimension.

FIG. 30 shows a further embodiment and uses like reference numerals from above where appropriate to facilitate understanding. A heat activated adhesive layer 232 is provided to selectively accept foil and in one embodiment is the same ink as pattern 212. Layer 232 has a portion 234 between image 210 and micromotion textured pattern 212. Layer 232 has a portion 236 between second surface 208 and micromotion textured pattern 212 without image 210 therebetween. In further embodiments, image layer 210 may be a reflective layer, with or without layer 232. The reflective layers are preferably provided by reflective foil transferred from a roll leaf or a hot stamp foil, as described above.

FIG. 31 shows a further embodiment and uses like reference numerals from above where appropriate to facilitate understanding. Micromotion textured pattern 212 is provided by heat activated ink, which may also be an adhesive, as described above, and reflective layer 214 is a foil transferred only to areas where the heat activated ink is applied, as above described. The foil is preferably transferred from roll leaf or hot stamp foil.

FIG. 32 shows a further embodiment and uses like reference numerals from above where appropriate to facilitate understanding. A protective coating backing layer 238 is provided over reflective layer 214. Base 202 and protective coating backing layer 238 are preferably plastic, further preferably acetate, further preferably polyester. The backing layer is bonded with pressure sensitive adhesive or thermal laminate.

See-through base 202 is preferably clear or semi-clear, and is preferably plastic, and further preferably polyester, though clear cellulose is also a possibility. The reflective layer 214 can be applied in many ways including selective metallization, liquid metal, thermal laminate of metallized material, pressure-sensitive adhesive coated with metallized material, metallic ink, solid glossy black material with or without metal, and the like, including as described above.

It is recognized that various equivalents, alternatives and modifications are possible within the scope of the appended claims.

What is claimed is:

1. A second surface micromotion display providing an illusion of motion, comprising a see-through base having a first surface, defined in the art as a front surface facing a viewer, and a second surface, defined in the art as a rear surface opposite to said front surface and facing away from the viewer, a micromotion textured pattern over said second surface, a reflective layer over said micromotion textured pattern such that the illusion of motion is viewable through said base as reflected from said reflective layer through said micromotion textured pattern, wherein said reflective layer is spaced from said second surface by said micromotion textured pattern therebetween, wherein said micromotion textured pattern comprises a plurality of convex shaped protrusions, and wherein said reflective layer conforms to said convex shaped protrusions, such that said reflective layer has convex surfaces facing away from said second surface, and has concave surfaces facing toward said second surface, such that light passing through said base is reflected by said concave surfaces back through said base to the viewer, and comprising an image formed over said second surface, and wherein said reflective layer is spaced from said second surface by said image and said micromotion textured pattern therebetween, and comprising an opaque layer between portions of said image and said micromotion textured pattern and blocking light transmission therethrough wherein said opaque layer includes a section between said image and said reflective layer with no portion of said micromotion textured pattern between said image and said reflective layer.

2. The second surface micromotion display according to claim 1 wherein said opaque layer is white.

3. The second surface micromotion display according to claim 1 wherein said reflective layer comprises a reflective foil layer transferred from roll leaf.

4. The second surface micromotion display according to claim 1 comprising a protective coating backing layer over said reflective layer.

5. The second surface micromotion display according to claim 1 wherein said micromotion textured pattern comprises heat activated ink, and said reflective layer comprises a foil transferred only to areas where said heat activated ink is applied.

6. The second surface micromotion display according to claim 1 wherein said micromotion textured pattern comprises parallel lines in sections.

7. The second surface micromotion display according to claim 5 wherein said foil is transferred from roll leaf.

8. The second surface micromotion display according to claim 5 wherein said foil is transferred from hot stamp foil.

9. A second surface micromotion display providing an illusion of motion, comprising a see-through base having a first surface, defined in the art as a front surface facing a viewer, and a second surface, defined in the art as a rear surface opposite to said front surface and facing away from the viewer, a micromotion textured pattern over said second surface, a reflective layer over said micromotion textured pattern such that the illusion of motion is viewable through said base as reflected from said reflective layer through said micromotion textured pattern, wherein said reflective layer is spaced from said second surface by said micromotion textured pattern therebetween, wherein said micromotion textured pattern comprises a plurality of convex shaped protrusions, and wherein said reflective layer conforms to said convex shaped protrusions, such that said reflective layer has convex surfaces facing away from said second surface, and has concave surfaces facing toward said second surface, such that light passing through said base is reflected by said concave surfaces back through said base to the viewer, and comprising an image formed over said second surface, and wherein said reflective layer is spaced from said second surface by said image and said micromotion textured pattern therebetween, and comprising an opaque layer between portions of said image and said micromotion textured pattern and blocking light transmission therethrough, wherein said opaque layer includes a section between said second surface and said reflective layer with no portion of said micromotion textured pattern and no portion of said image between said second surface and said reflective layer.

10. A method for making a second surface micromotion display comprising providing a see-through base having a first surface, defined in the art as a front surface facing a viewer, and a second surface, defined in the art as a rear surface opposite to said front surface and facing away from the viewer, forming a micromotion textured pattern over said second surface, forming a reflective layer over said micromotion textured pattern such that the illusion of motion is viewable through said base as reflected from said reflective layer through said micromotion textured pattern, and comprising spacing said reflective layer from said second surface by said micromotion textured pattern therebetween, and comprising forming said micromotion textured pattern by a plurality of convex shaped protrusions, and conforming said reflective layer to said convex shaped protrusions such that said reflective layer has convex surfaces facing away from said second surface, and has concave surfaces facing toward said second surface, such that light passing through said base is reflected by said concave surfaces back through said base to the viewer, and comprising forming an image over said second surface, and spacing said reflective layer from said second surface by said image and said micromotion textured pattern therebetween, and comprising providing an opaque layer between selected portions of said image and said micromotion textured pattern and blocking light transmission therethrough, and comprising providing said opaque layer with a section between said image and said reflective layer with no portion of said micromotion textured pattern between said image and said reflective layer.

11. The method according to claim 10 providing said micromotion textured pattern as heat activated ink, and providing said reflective layer as a foil transferred only to areas where said heat activated ink is applied.

12. A method for making a second surface micromotion display comprising providing a see-through base having a first surface, defined in the art as a front surface facing a viewer, and a second surface, defined in the art as a rear surface opposite to said front surface and facing away from the viewer, forming a micromotion textured pattern over said second surface, forming a reflective layer over said micromotion textured pattern such that the illusion of motion is viewable through said base as reflected from said reflective layer through said micromotion textured pattern, and comprising spacing said reflective layer from said second surface by said micromotion textured pattern therebetween, and comprising forming said micromotion textured pattern by a plurality of convex shaped protrusions, and conforming said reflective layer to said convex shaped protrusions such that said reflective layer has convex surfaces facing away from said second surface, and has concave surfaces facing toward said second surface, such that light passing through said base is reflected by said concave surfaces back through said base to the viewer, and comprising forming an image over said second surface, and spacing said reflective layer from said second surface by said image and said micromotion textured pattern therebetween, and comprising providing an opaque layer between selected portions of said image and said micromotion textured pattern and blocking light transmission therethrough, and comprising providing said opaque layer with a section between said second surface and said reflective layer with no portion of said micromotion textured pattern and no portion of said image between said second surface and said reflective layer.

13. A second surface micromotion display providing an illusion of motion, comprising a see-through base having a first surface, defined in the art as a front surface facing a viewer, and a second surface, defined in the art as a rear surface opposite to said front surface and facing away from the viewer, a micromotion textured pattern over said second surface, wherein said illusion of motion is created by said micromotion textured pattern comprised of distinct sections of parallel transparent texture lines, wherein adjacent sections of said parallel transparent texture lines are formed at different angles, controlling reflected light to create said illusion of motion, a reflective layer over said micromotion textured pattern such that the illusion of motion is viewable through said base as reflected from said reflective layer through said micromotion textured pattern, wherein said reflective layer is spaced from said second surface by said micromotion textured pattern therebetween, wherein said micromotion textured pattern comprises a plurality of convex shaped protrusions, and wherein said reflective layer conforms to said protrusions, such that said reflective layer has convex surfaces facing away from said second surface, and has concave surfaces facing toward said second surface, such that light passing through said base is reflected by said concave surfaces back through said base to the viewer.

14. The second surface micromotion display according to claim 13 wherein said reflective layer is a vacuum metallized layer.

* * * * *